(12) United States Patent
Kashima et al.

(10) Patent No.: US 7,653,623 B2
(45) Date of Patent: Jan. 26, 2010

(54) INFORMATION SEARCHING APPARATUS AND METHOD WITH MECHANISM OF REFINING SEARCH RESULTS

(75) Inventors: Kazunori Kashima, Kawasaki (JP);
Toshimitsu Suzuki, Kawasaki (JP);
Toshiyuki Fujiwara, Kanagawa (JP);
Soushi Shimoda, Tokyo (JP)

(73) Assignee: Fujitsu Limited, Kawasaki (JP)

( * ) Notice: Subject to any disclaimer, the term of this patent is extended or adjusted under 35 U.S.C. 154(b) by 157 days.

(21) Appl. No.: 11/298,512

(22) Filed: Dec. 12, 2005

(65) Prior Publication Data
US 2007/0050335 A1   Mar. 1, 2007

(30) Foreign Application Priority Data
Aug. 26, 2005   (JP) .............................. 2005-246421

(51) Int. Cl.
*G06F 17/30* (2006.01)
(52) U.S. Cl. .................. 707/5; 707/4; 707/10; 709/218
(58) Field of Classification Search ...................... 707/3, 707/1, 4, 5, 10; 709/218
See application file for complete search history.

(56) References Cited

U.S. PATENT DOCUMENTS

| | | | | |
|---|---|---|---|---|
| 2002/0103786 | A1* | 8/2002 | Goel | 707/3 |
| 2004/0186827 | A1* | 9/2004 | Anick et al. | 707/3 |
| 2004/0220902 | A1* | 11/2004 | Gates et al. | 707/3 |
| 2004/0220905 | A1* | 11/2004 | Chen et al. | 707/3 |
| 2005/0154723 | A1* | 7/2005 | Liang | 707/3 |
| 2006/0106792 | A1* | 5/2006 | Patterson | 707/5 |
| 2006/0184521 | A1* | 8/2006 | Ponte | 707/5 |
| 2006/0259481 | A1* | 11/2006 | Handley | 707/5 |

OTHER PUBLICATIONS

Online document entitled: "Search Method and Help" available in Japanese at http://www.google.co.jp/intl/ja/help/refinesearch.html and in English at http://www.google.com/help/refinesearch/html (latter version attached).
"Search Method and Help", retrieved from Internet: URL: http://www.google.co.jp/intl/ja/help/refinesearch.html on Aug. 9, 2005.

* cited by examiner

*Primary Examiner*—Hosain T Alam
*Assistant Examiner*—Amy Ng
(74) *Attorney, Agent, or Firm*—Staas & Halsey

(57) ABSTRACT

An information searching apparatus and method capable of producing good search results even in the case where specified search keywords are found separately on a plurality of documents. Upon receipt of a search request from a client, a first search process searches an index memory to find tentative search results. According to predetermined rules, it is determined to which group each tentative search result should belong. A second search process then searches documents at an upper hierarchical level in the same group, thus finding keyword hits in an upper-level document. A higher priority is then given to a group of documents in which the second search process has found keyword hits. Finally a list of locators is compiled and sent back to the requesting client to indicate the locations of relevant documents, where the locators are arranged in descending order of the display priority of corresponding groups.

13 Claims, 24 Drawing Sheets

41 HIT COUNT TABLE

| ORDER | SEARCH KEYWORD / HIT URL | KEYWORD #1 FTSU | KEYWORD #2 officers | KEYWORD #3 list | KEYWORD #4 president | KEYWORD #5 executive director |
|---|---|---|---|---|---|---|
| | http://www.x.com/**/a.html | 1 | 0 | 0 | 0 | 0 |
| 1 | http://www.y.com/**/b.html | 0 | 1 | 1 | 1 | 1 |
| | http://www.z.com/**/c.html | 1 | 0 | 0 | 1 | 0 |
| | http://www.123.com/**/d.html | 1 | 0 | 1 | 1 | 0 |
| | http://www.456.com/**/e.html | 1 | 0 | 0 | 0 | 0 |
| 2 | http://www.z.com/**/f.html | 0 | 0 | 0 | 1 | 1 |

| KEYWORD #6 chairman | KEYWORD #7 vice chairman | SEARCH RESULT |
|---|---|---|
| 0 | 0 | 1 |
| 1 | 0 | 5 |
| 0 | 0 | 2 |
| 1 | 0 | 3 |
| 0 | 0 | 2 |
| 1 | 1 | 4 |

FIG. 11

42 KEYWORD HIT COUNT TABLE

| ORDER | SEARCH KEYWORD / SITE DOMAIN | KEYWORD #1 FTSU | KEYWORD #2 officers | KEYWORD #3 list | KEYWORD #4 president | KEYWORD #5 executive director |
|---|---|---|---|---|---|---|
| 1 | http://www.z.com/ | 1 | 0 | 0 | 0 | 0 |
| 2 | http://www.y.com/ | 0 | 0 | 0 | 0 | 0 |
| 2 | http://www.123.com/ | 0 | 0 | 0 | 0 | 0 |
| 2 | http://www.456.com/ | 0 | 0 | 0 | 0 | 0 |
| 2 | http://www.x.com/ | 0 | 0 | 0 | 0 | 0 |

| KEYWORD #6 chairman | KEYWORD #7 vice chairman | KEYWORD HIT SCORE |
|---|---|---|
| 0 | 0 | 1 |
| 0 | 0 | 0 |
| 0 | 0 | 0 |
| 0 | 0 | 0 |
| 0 | 0 | 0 |

(the number of non-zero keyword fields)

43 INTRA-SITE HIT COUNT TABLE

| ORDER | SEARCH KEYWORD / URL | KEYWORD #1 FTSU | KEYWORD #2 officers | KEYWORD #3 list | KEYWORD #4 president | KEYWORD #5 executive director | KEYWORD #6 chairman | KEYWORD #7 vice chairman | KEYWORD HIT SCORE α (number of non-zero hit keywords) |
|---|---|---|---|---|---|---|---|---|---|
| 3 | http://www.z.com/\*\*/b.html | 3 | 1 | 2 | 0 | 0 | 0 | 0 | 3 |
| 2 | http://www.z.com/\*\*\*\*/ff.html | 4 | 0 | 0 | 1 | 0 | 1 | 0 | 3 |
| 6 | http://www.z.com/\*\*\*/u.html | 9 | 0 | 0 | 0 | 0 | 0 | 0 | 1 |
| 1 | http://www.z.com/\*\*/f.html | 0 | 2 | 0 | 1 | 2 | 1 | 1 | 4 |
| 4 | http://www.z.com/\*\*\*/j.html | 11 | 0 | 4 | 0 | 0 | 0 | 0 | 3 |
| 5 | http://www.z.com/\*\*\*/k.html | 18 | 3 | 2 | 3 | 2 | 2 | 1 | 2 |
| (a) | KEYWORD HIT SCORE | 45 | 2 | 6 | 3 | 1 | 2 | 1 | |
| (b) | DOCUMENT HIT SCORE | 5 | 6 | 12 | 9 | 2 | 4 | 1 | |
| | RARITY SCORE β (=a*b) | 225 | | | | | | | |
| | PRIORITY | 7 | | | | | | | |

FIG. 18

About Us > List of Officers

Meet the officers of our company ...Home |News |Products & Services |Support & Downloads |Contact |Shop, > About Us >List of Officers, About Us ... All Right Reserved, Copyright (C) ....

http://www.y.com/**/b.html

Corporate Overview: FTSU

The FTSU Way · Corporate Message · Corporate Governance · List of Officers · Sales Offices· Business Operations · Factories · Worldwide Offices · Showrooms · Schools, Training Centers, Hospitals · Domestic Groups · Worldwide Locations and Groups ...

http://www.y.com/****/f.html

Corporate Governance: FTSU for the benefit of stakeholders including shareholders, FTSU pursues transparent and efficient management of ... Board of directors is responsible for particularly important business decisions. ... Above: How we execute and supervise our business operations... FTSU Limited List of Officers...

http://www.y.com/***/u.html

Site Map: FTSU

The FTSU Way · Corporate Message · Corporate Governance · List of Officers · President · Jane Doe · Sales Offices · Business Operations · Factories · Worldwide Offices · Showrooms · Schools, Training Centers, Hospitals · Domestic Groups · Worldwide Locations and Groups ...

http://www.y.com/*/v.html

▲ Next

[ Select site for another search ]

▼ Prev

Corporate Overview: – FTSU BUSINESS SYSTEMS Japan

Corporate Overview – FTSU BUSINESS SYSTEMS Japan. ... a FTSU company FJB, Left menu

FIG. 19

42 KEYWORD HIT COUNT TABLE

| ORDER | SITE DOMAIN \ SEARCH KEYWORD | KEYWORD #1 | KEYWORD #2 | KEYWORD #3 | KEYWORD #4 | KEYWORD #5 |
|---|---|---|---|---|---|---|
| | | FTSU | officers | list | president | executive director |
| 1 | http://www.z.com/ | 1 | 0 | 1 | 0 | 0 |
| 2 | http://www.y.com/ | 0 | 0 | 0 | 0 | 0 |
| 2 | http://www.123.com/ | 0 | 0 | 0 | 0 | 0 |
| 2 | http://www.456.com/ | 0 | 0 | 0 | 0 | 0 |
| 2 | http://www.x.com/ | 0 | 0 | 0 | 0 | 0 |

| KEYWORD #6 | KEYWORD #7 | KEYWORD HIT SCORE |
|---|---|---|
| chairman | vice chairman | |
| 0 | 0 | 2 |
| 0 | 0 | 0 |
| 0 | 0 | 0 |
| 0 | 0 | 0 |
| 0 | 0 | 0 |

(the number of non-zero keyword fields)

FIG. 21

41 HIT COUNT TABLE

| ORDER | SEARCH KEYWORD / HIT URL | KEYWORD #1 FTSU | KEYWORD #2 officers | KEYWORD #3 list | KEYWORD #4 president | KEYWORD #5 executive director |
|---|---|---|---|---|---|---|
| | http://www.x.com/**/a.html | 1 | 0 | 0 | 0 | 0 |
| 2 | http://www.y.com/**/b.html | 0 | 1 | 1 | 1 | 1 |
| | http://www.z.com/**/c.html | 1 | 0 | 0 | 1 | 0 |
| | http://www.123.com/**/d.html | 1 | 0 | 0 | 1 | 0 |
| | http://www.456.com/**/e.html | 1 | 0 | 1 | 0 | 0 |
| 1 | http://www.z.com//f.html | 1 | 0 | 1** | 1 | 1 |

| KEYWORD #6 chairman | KEYWORD #7 vice chairman | SEARCH RESULT |
|---|---|---|
| 0 | 0 | 1 |
| 1 | 0 | 5 |
| 0 | 0 | 2 |
| 1 | 0 | 3 |
| 0 | 0 | 2 |
| 1 | 1 | 6 |

INFORMATION SEARCHING APPARATUS AND METHOD WITH MECHANISM OF REFINING SEARCH RESULTS

CROSS-REFERENCE TO RELATED APPLICATIONS

This application is based upon and claims the benefits of priority from the prior Japanese Patent Application No. 2005-246421, filed on Aug. 26, 2005, the entire contents of which are incorporated herein by reference.

BACKGROUND OF THE INVENTION

1. Field of the Invention

The present invention relates to an apparatus and method for information search, and more particularly to an information searching apparatus and method that search documents arranged in a hierarchical structure.

2. Description of the Related Art

Information search services play an essential role in effective use of a large amount of documents on the Internet and other networks. Application programs for web search service are therefore installed in servers for portal sites or the like. Such web search applications run on a server to provide search engine capabilities that enable users to search online resources easily.

Some search engines employ a program called "robot" that continuously crawls through the network to collect document information. This type of search engines extract keywords from collected documents to construct a database, known as an "index," containing a list of extracted keywords associated with the individual documents. When a search request is received from a client, the search engine consults the index files to find records that match with the search keywords specified in the request. If relevant records are found, the search engine sends search results back to the client, including uniform resource locators (URLs) of the found documents.

Public information available on a website is not necessarily concentrated in a single location. Rather, it is often divided in a plurality of documents written in the hypertext markup language (HTML) format, for example. Conventional search engines perform a search on individual HTML files in a website.

FIG. 24 shows an example of a conventional search technique. It is assumed in FIG. 24 that an index memory 91 of a search engine 92 contains three sets of indexes 91a, 91b, and 91c created previously for three documents that are accessible by their respective URLs, "A.html," "B.html," and "C.html" (domain name is omitted for simplicity). Those documents are available on a website of a company named "FTSU Limited" (which is a fictitious name for explanatory purposes). Note that A.html includes the term "FTSU," and C.html includes the term "officers."

Suppose now that a user has sent a search string "FTSU and officers" to the search engine 92 in an attempt to find a list of corporate officers of FTSU Limited. The reserved word "and" in this search string serves as a logical AND operator, which commands the search engine 92 to retrieve documents containing both search keywords, "FTSU" and "officers," by consulting the indexes 91a, 91b, and 91c. In other words, the search engine 92 will not pick up those documents unless they contain every specified keyword. Because of this restricted search condition, no match is found on the website of FTSU Limited in the present example.

While the documents like A.html and C.html may have originally been a single document, they are actually stored as separate files because of some managerial needs in the website system operations. As a consequence, an AND search ends up with no hits, failing to provide the user with the needed information. The AND search would be successful if the two documents were indexed as a single combined document on the search site. However, combining multiple documents often results in a too large file for a search engine to handle efficiently. The users would therefore experience slow responses in searching and displaying documents. For this reason, combining documents is not a practical approach.

To seek more documents related to the topic, the users may use an OR search, instead of an AND search, instructing the search engine to find documents containing "FTSU Limited" or "officers" or both. However, the search results of this OR search are likely to include a large number of irrelevant hits.

Refining, or narrowing down, search results is then expected to be a better approach to achieve good outcomes. One technique for refining search results is to restrict the search. A domain search allows a user to designate a specific website domain for searching. If a domain name is specified, the search engine searches documents only within that domain. If, in the present example, the user knows the domain name of a website of FTSU Limited, he/she can specify that site as a search domain in seeking documents with a search keyword "officers." By doing so the user can reach C.html, which is a desired search result. This type of domain search technique is used by Google.

The above-described domain search technique, of course, is only useful in the case the target domain name is known. Many of the novice search site users, however, do not know such refining techniques. They have to repeat search sessions, adding and changing search keywords, until they can reach the desired information. The search, however, would only be successful if the document includes all specified search keywords.

While it would be also possible to add keywords for each site, doing this for every site on the Internet requires an enormous amount of workload. This would impose excessive administrative burdens on the operating company of a search engine.

SUMMARY OF THE INVENTION

In view of the foregoing, it is an object of the present invention to provide an information searching apparatus and method that produce good search results even in the case where specified search keywords are found separately on a plurality of target documents.

To accomplish the above object, the present invention provides an information searching apparatus for searching documents arranged in a hierarchical manner. This information searching apparatus has the following elements: an index memory, a first search module, a categorizer, a second search module, a group order determiner, and a search result sender. The index memory stores indexes of documents to be searched. Each index contains keywords extracted from the corresponding document in association with a locator of that document. Upon receipt of a search request specifying a plurality of search keywords from a client, the first search module searches the index memory to find documents whose corresponding indexes contain at least one of the specified search keywords. The first search module identifies the found documents as tentative search results. The categorizer then determines to which group each tentative search result should belong, according to predefined rules. The second search module searches an upper hierarchical level in the same group of the tentative search result to find a document containing at least one of the specified search keywords. The group order determiner gives a higher display priority to the group in which the second search module has found the upper-level document. Finally the search result sender extracts the locator of each search result from the index memory and, based on the association between the groups and the extracted locators, rearranges the locators in descending order of the display priority before sending the locators to the client.

To accomplish the above object, the present invention also provides a computer-implemented method for searching documents arranged in a hierarchical manner. This method includes the following steps: (a) storing indexes of documents in an index memory, each index containing keywords extracted from the corresponding document in association with a locator of that document; (b) searching the index memory upon receipt of a search request specifying a plurality of search keywords from a client, to find documents whose corresponding indexes contain at least one of the specified search keywords, and identifying the found documents as tentative search results; (c) determining to which group the tentative search result should belong, according to predefined rules; (d) searching an upper hierarchical level in the same group of the tentative search result to find a document containing at least one of the specified search keywords; (e) giving a higher display priority to the group in which the second search module has found the upper-level document; and (f) extracting the locator of each search result from the index memory and, based on association between the groups and the extracted locators, rearranging the locators in descending order of the display priority before sending the locators to the client.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 11 shows an example of a hit count table.

FIG. 13 shows an example of a keyword hit count table.

FIG. 15 shows an example of an intra-site hit count table.

FIG. 18 shows a document containing a list of officers.

FIG. 19 shows an example screen displaying a search result.

FIG. 21 shows an example of a keyword hit count table.

FIG. 22 shows how the hit count table is updated.

DESCRIPTION OF THE PREFERRED EMBODIMENTS

Figure 1:
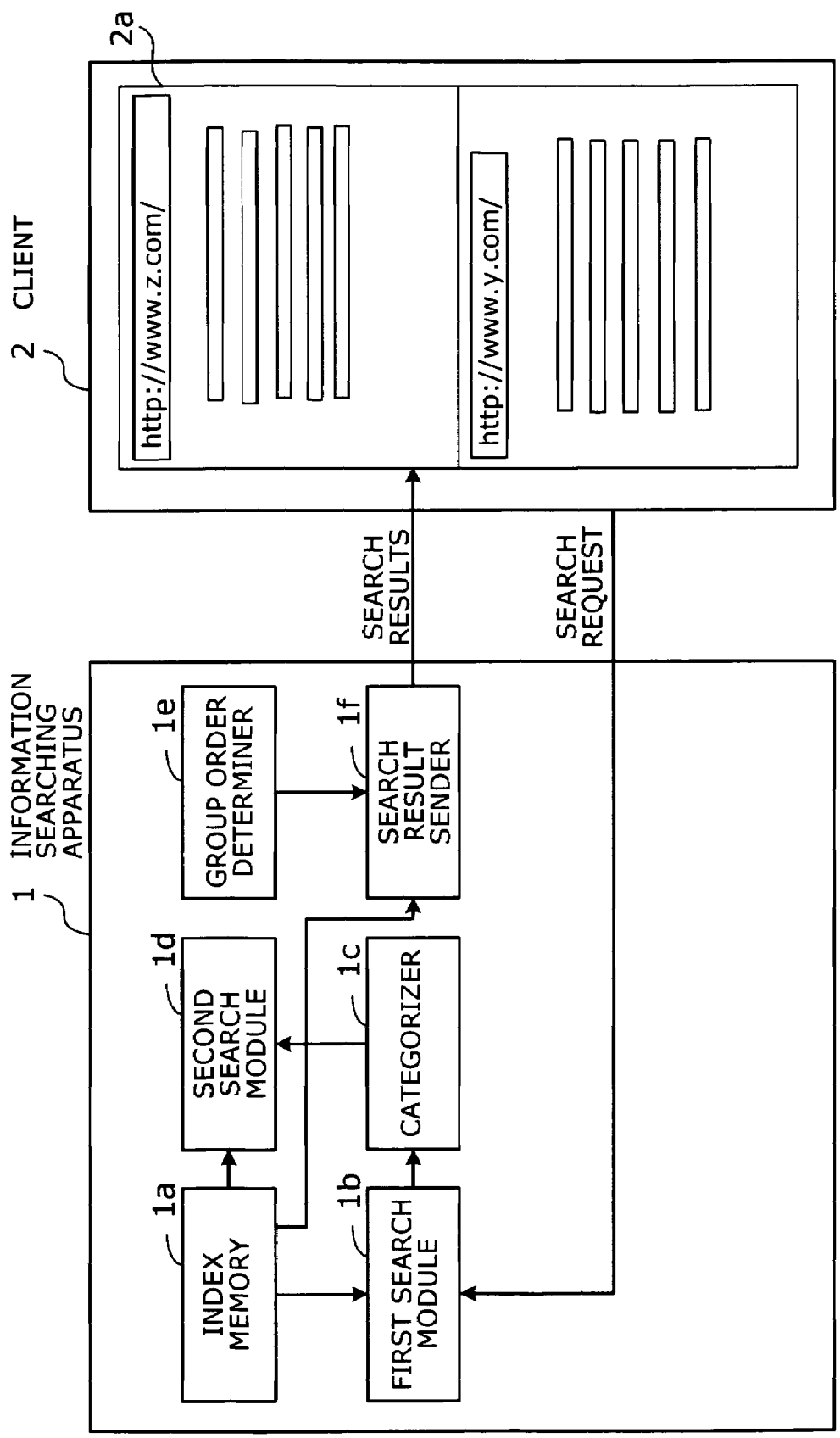
FIG. 1 provides an overview of an embodiment of the present invention.

Preferred embodiments of the present invention will be described below with reference to the accompanying drawings, wherein like reference numerals refer to like elements throughout.

FIG. 1 provides an overview of an embodiment of the present invention. This embodiment is intended to provide an information searching apparatus capable of finding desired documents in public websites or the like even if they are stored in different folders (directories) in a target search domain. To this end, the illustrated information searching apparatus 1 has the following elements: an index memory $1a$, a first search module $1b$, a categorizer $1c$, a second search module $1d$, a group order determiner $1e$, and a search result sender $1f$.

The index memory $1a$ stores indexes of documents to be searched. An index is a collection of keywords extracted from the corresponding document, stored together with location information (locator) of that document. Think of, for example, documents publicly available on a website. An indexer (not shown in FIG. 1) periodically makes access to such www documents at regular interval to extract keywords and compile them as an index.

Upon receipt of a search request specifying a plurality of search keywords from a client 2, the first search module $1b$ searches the index memory $1a$ for an index containing at least one of the specified search keywords. When an index satisfying the condition is found, the document associated with that index is identified as a tentative search result.

The categorizer $1c$ then determines to which group each tentative search result should belong, according to predefined rules. For example, search results are grouped according to their domain names.

With the same specified keywords, the second search module $1d$ searches documents at an upper hierarchical level in the same group (domain) as that of the tentative search result. Here the term "upper hierarchical level" refers to a directory that is closer to the root domain of a website. For example, it searches documents in the topmost directory (root domain) of the same group. The second search module $1d$ may optionally be configured to limit the scope of search to a set of keywords that are defined explicitly in the target documents. This is based on the observation that some common characteristics of a website can often be seen from keywords that the website administrator has embedded in an upper-level document of the website.

The group order determiner $1e$ gives a higher display priority to a group of documents that the second search module $1d$ has found relevant. More specifically, the more the second search module $1d$ finds different keywords in a group of documents, the higher their display order will be. The display order may also be affected by some conditions other than the outcomes of the second search module $1d$. In that case, the groups identified by the second search module $1d$ are prioritized over other groups as long as they satisfy the same extra conditions mentioned above.

The search result sender 1f extracts a locator of each search result from the index memory 1a and rearranges those locators in descending order of display priority, based on to which groups they belong. The search result sender 1f then sends the rearranged list of locators to the client 2. More specifically, the tentative search results are sorted according to their groups, and an output form (e.g., an HTML document) is compiled from the grouped search results for delivery to the client 2, such that the group with the highest priority will appear at the topmost part of the form.

The above-described information searching apparatus 1 operates as follows. When a search request comes, the first search module 1b searches the index memory 1a to find an index containing at least one specified keyword, and the document associated with that index is identified as a tentative search result. The categorizer 1c then determines to which group each tentative search result should belong, according to predetermined rules. Subsequently, the second search module 1d searches other documents at an upper level of the hierarchy in the same group as the tentative search result belongs to, thus finding relevant documents containing at least one specified keyword. The group order determiner 1e gives a higher priority to the group of documents that the second search module 1d has found relevant, in displaying the search results. Finally, the search result sender 1f extracts a locator of each search result from the index memory 1a. The extracted locators are rearranged in descending order of display priority of their respective groups. The search result sender 1f sends this sorted list of locators to the requesting client 2. Finally, a search result screen 2a is displayed on the client 2, in which the search results are shown in accordance with their group, beginning with URLs in the topmost group that has been selected by the group order determiner 1e.

In the way described above, the present embodiment virtually consolidate search results from each group of related documents without the need for physically combining such documents at websites. This feature of the present embodiment enables users to reach their desired information even if individual documents include only a part of specified search keywords.

Think of, for example, searching for the names of officers of FTSU Limited from a search site. Suppose also that the company name "FTSU Limited" is usually abbreviated as "FTSU," and that some HTML documents on the FTSU website contain the names of officers, but none of them includes the keyword "FTSU." This kind of situations actually take place in the case where a web document is divided in HTML frames. In this case the information content is physically distributed in a plurality of HTML documents. In a typical design of a business website, one frame is used to outline the contents of the site, and another frame is used to provide each detailed topic, such as the names of corporate officers. While both frames appear together on the same browser screen, the information is divided in two different physical files.

In the situation stated above, an AND search with keywords of "officers" and "FTSU" would end up, not with the desired information from the website of FTSU Limited, but with irrelevant documents, such as a press release from an affiliate company of FTSU, appearing at the top portion of a search result window. It is not easy for the user to reach the exact web page on which the officers of FTSU Limited are listed. In fact, the FTSU website as a whole does contain both keywords "FTSU" and "officers" in the present example. But since each individual HTML document lacks some keywords, the conventional search engine cannot find those documents at all. Knowing that most companies publicize the information about their management team, the user suspects that the search engine he/she is using is incapable of indexing all web documents.

The information searching apparatus of FIG. 1, on the other hand, regards the entire website of FTSU Limited as a single group and repeats searching upper-level indexes of the FTSU website, thereby sorting and retrieving relevant HTML documents automatically from the same website, overcoming the fact that some of those documents lack the keyword "FTSU." In addition, the proposed information searching apparatus supplies the user with an integrated view of search results retrieved from a particular group of documents even if such documents are divided in different physical files. While it is hard for a website to provide all information in a single document, the information searching apparatus of the present embodiment realizes it by virtually combining all documents in a website as a single group during the process of searching. The user can find a desired document easily since the information searching apparatus handles a website domain as a single group and sorts out relevant documents in that website domain depending on how much they agree with the specified search conditions.

Figure 2:
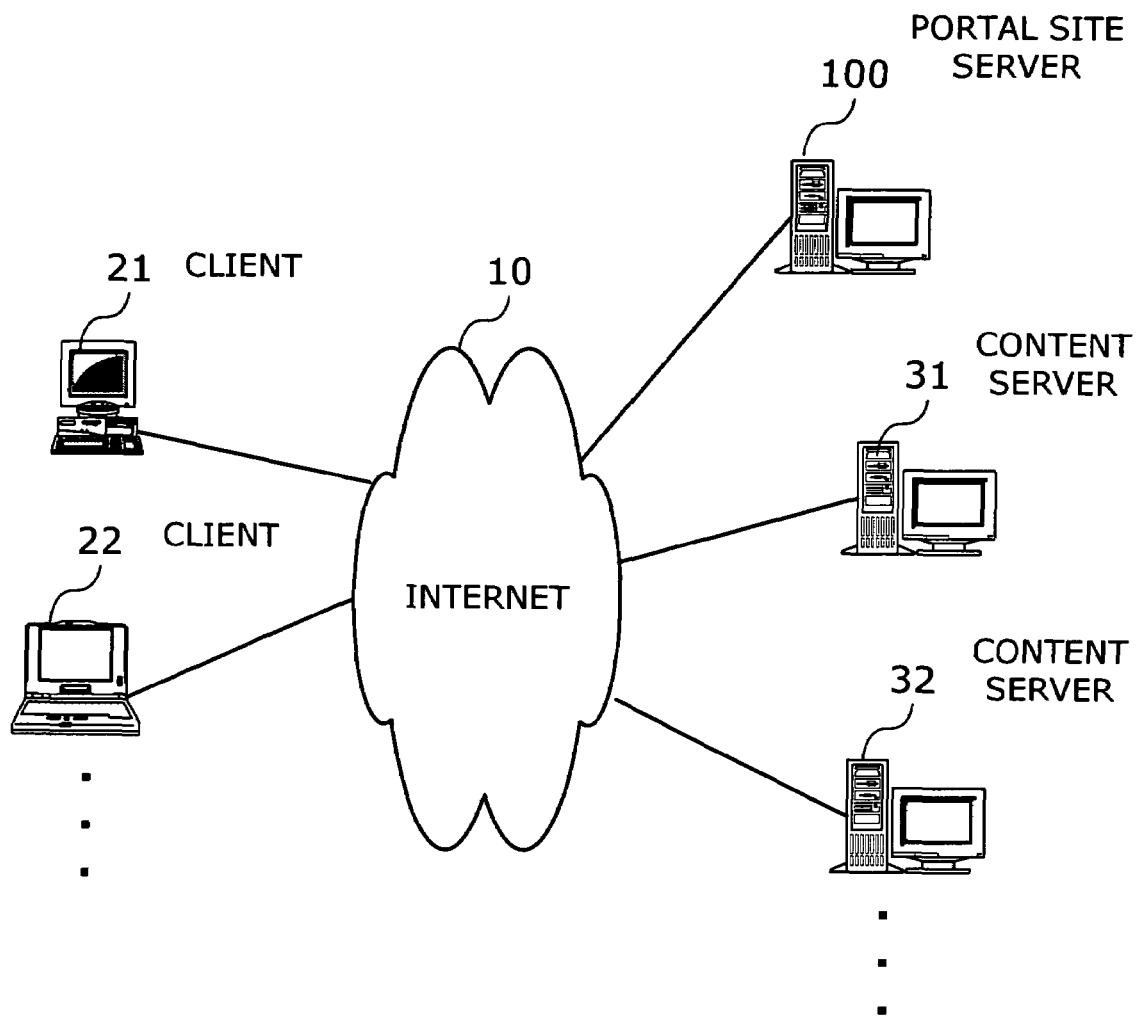
FIG. 2 is a block diagram of a system according to an embodiment of the present invention.

The following will now describe a more specific embodiment of the present invention. FIG. 2 is a block diagram of a system according to an embodiment of the invention. Attached to the Internet 10 are: a portal site server 100, a plurality of clients 21, 22, and so on, and a plurality of content servers 31, 32, and so on.

The portal site server 100 is a computer that provides various services including Internet search services that help users make access to the information available on the Internet 10. Clients 21 and 22 are user computers in which a web browser application is installed for users to browse documents on the Internet 10. The content servers 31 and 32 have a web server application (hereafter, "web server") to make documents accessible over the Internet 10.

Figure 3:
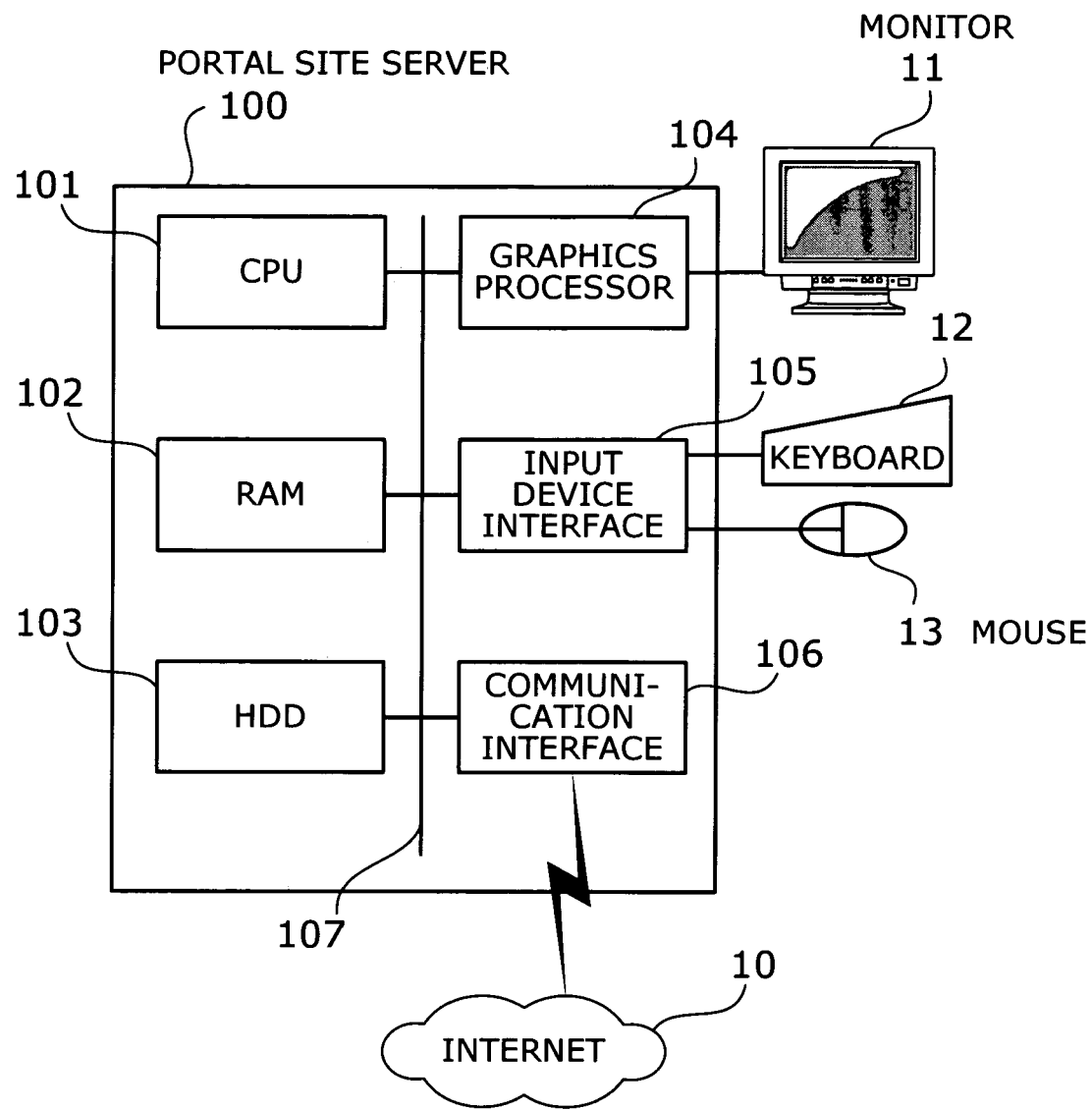
FIG. 3 shows an example hardware configuration of a portal site server used in the present embodiment.

FIG. 3 shows an example hardware configuration of the portal site server 100 used in the present embodiment. The illustrated portal site server 100 has the following functional elements: a central processing unit (CPU) 101, a random access memory (RAM) 102, a hard disk drive (HDD) 103, a graphics processor 104, an input device interface 105, and a communication interface 106. The CPU 101 controls the entire server system, interacting with other elements via a bus 107. The RAM 102 serves as temporary storage for the whole or part of operating system (OS) programs and application programs that the CPU 101 executes, in addition to storing other various data objects manipulated at runtime. The HDD 103 stores program and data files of the operating system and various applications.

The graphics processor 104 produces video images in accordance with drawing commands from the CPU 101 and displays them on the screen of an external monitor 11 coupled thereto. The input device interface 105 is used to receive signals from external input devices, such as a keyboard 12 and a mouse 13. Those input signals are supplied to the CPU 101 via the bus 107. The communication interface 106 is connected to the Internet 10, allowing the CPU 101 to exchange data with other computers on the Internet 10.

The computer system described above serves as a hardware platform for realizing processing functions of the present embodiment. While FIG. 3 shows an example of the portal site server 100, the same or similar hardware platform can also be used to implement other computers including the clients 21 and 22 and content servers 31 and 32.

Figure 4:
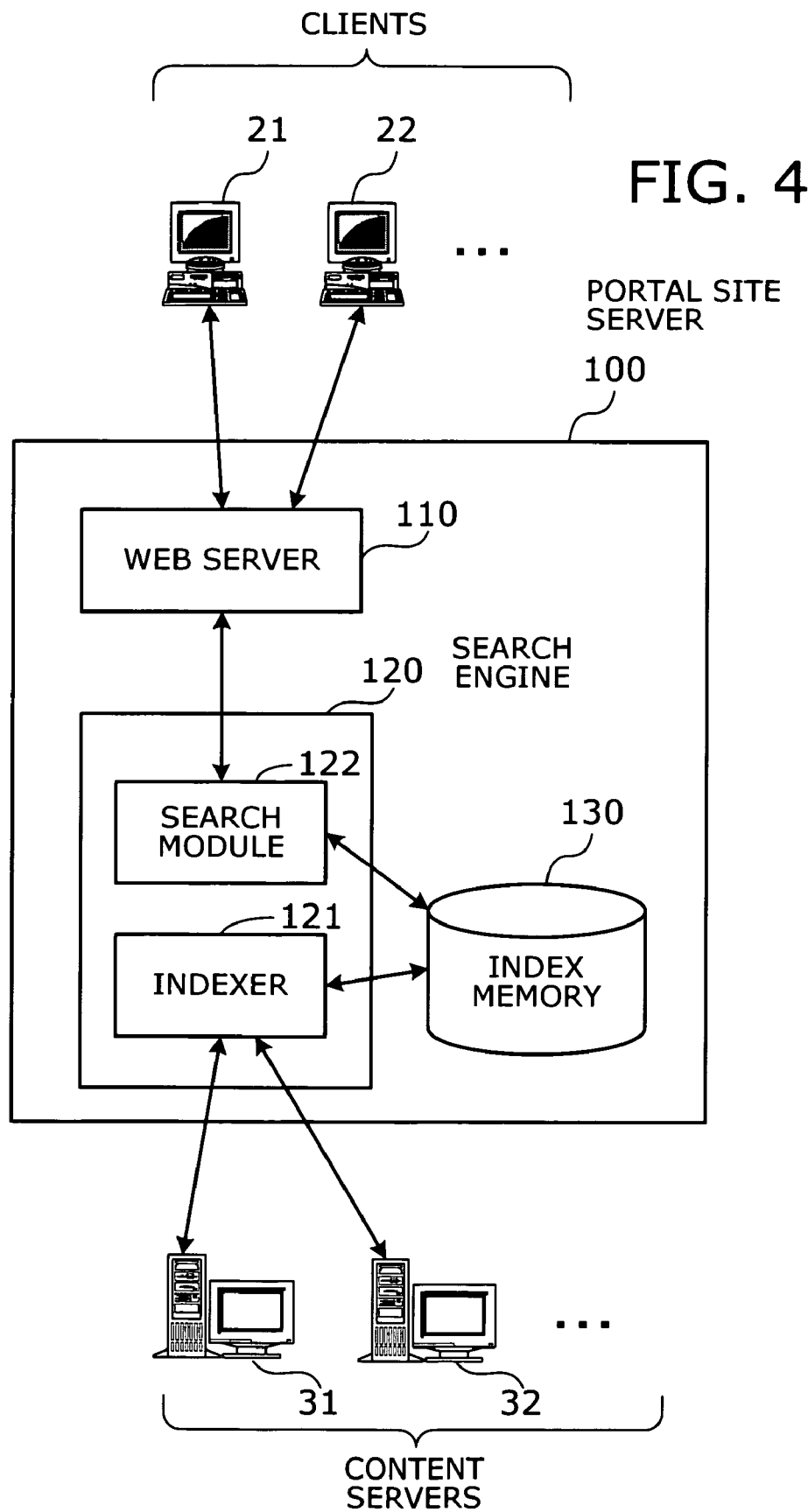
FIG. 4 is a block diagram showing functions of a portal site server.

FIG. 4 is a block diagram showing functions of the portal site server 100. As can be seen, the portal site server 100 has a web server 110, a search engine 120, and an index memory 130. The web server 110 offers HTML documents or the like to the clients 21 and 22. Upon receipt of a search request from a client, the web server 110 passes it to the search engine 120 and waits for search results returning from the search engine 120. The web server 110 then sends a page containing the received search results back to the requesting client.

The search engine 120 receives a client's search request via the web server 110 and searches public documents on the Internet 10 accordingly. Upon completion, the search engine 120 returns the result to the web server 110 by sending the URLs of documents relevant to the given search conditions.

Document search functions of the search engine 120 are largely divided into two blocks: an indexer 121 and a search module 122. The indexer 121 makes access to the content servers 31 and 32 over the Internet 10 at regular intervals to download available documents and extracts keywords from them. The indexer 121 then creates an index that associates each document's URL with the extracted keywords. Such index data of many documents is stored in the index memory 130.

With reference to the index memory 130, the search module 122 searches for documents relevant to a given search request, thus obtaining a set of URLs. Subsequently the search module 122 sorts those URLs according to their respective keyword match ratios. To determine the order of URLs in this sorting process, the search module 122 refers to keywords included in the topmost document in the domain of each document of interest. The search module 122 passes the sorted URLs and other related information to the web server 110.

Figure 5:
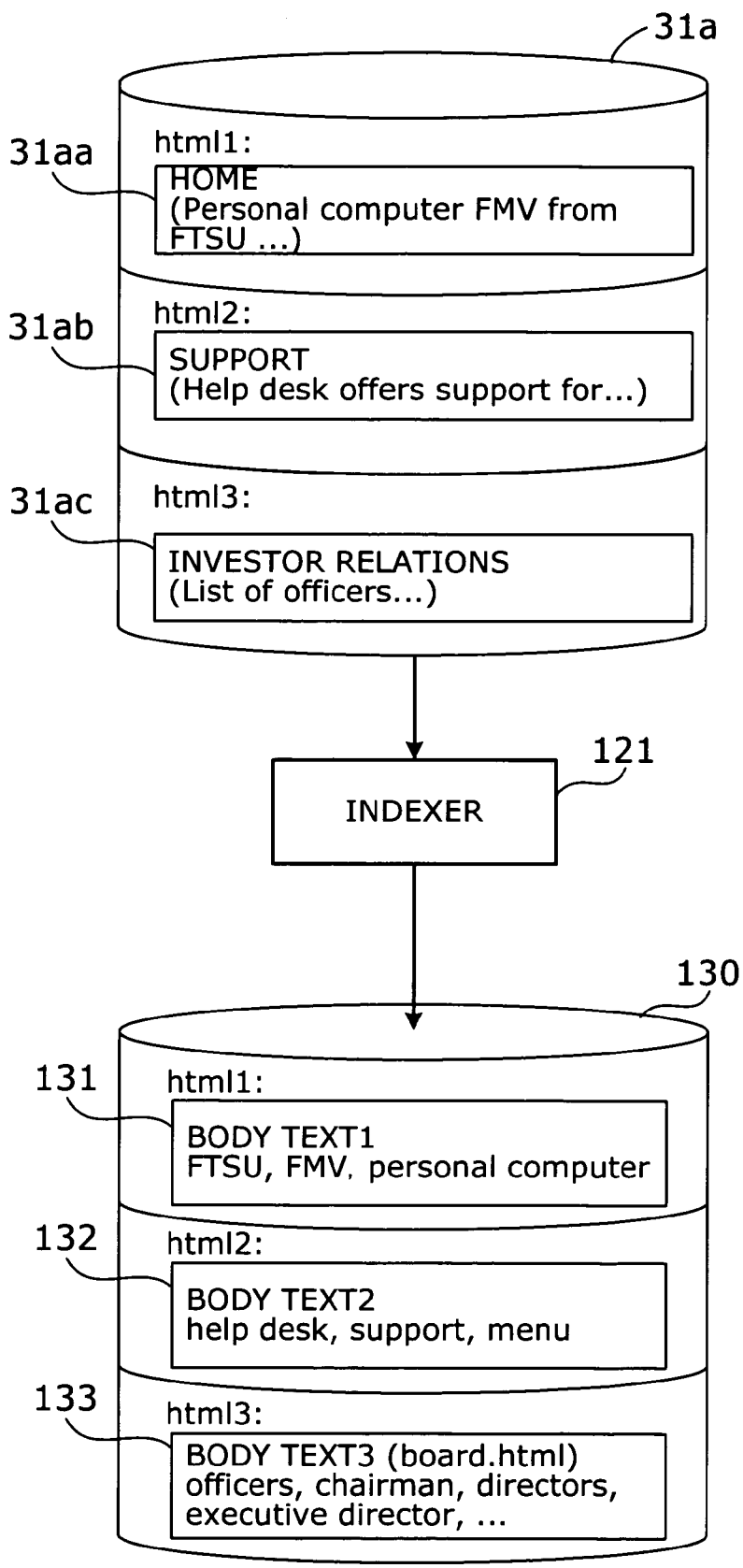
FIG. 5 shows a process of indexing documents.

The portal site server 100 executes various processing tasks as will be described in detail below. Referring first to FIG. 5, the explanation begins with an indexing process performed by the indexer 121. FIG. 5 depicts a situation where the indexer 121 is creating index files from documents 31aa, 31ab, and 31ac stored in a storage device 31a of the content server 31. Document file names are indicated at the upper left of each document 31aa, 31ab, and 31ac. The top line of each box representing an individual document 31aa, 31ab, or 31ac shows the title of a document (e.g., "HOME," "SUPPORT"), which is followed by the actual body text in parentheses. It is assumed here that those documents are located in a structured directory system, the first document 31aa being on top of the other two documents 31ab and 31ac.

Upon receipt of documents 31aa, 31ab, and 31ac from the content server 31, the indexer 121 creates indexes 131, 132, and 133 for the documents. These indexes 131, 132, and 133 contain keywords found in the body text of corresponding documents 31aa, 31ab, and 31ac. The created indexes 131, 132, and 133 are saved in the index memory 130.

Figure 6:
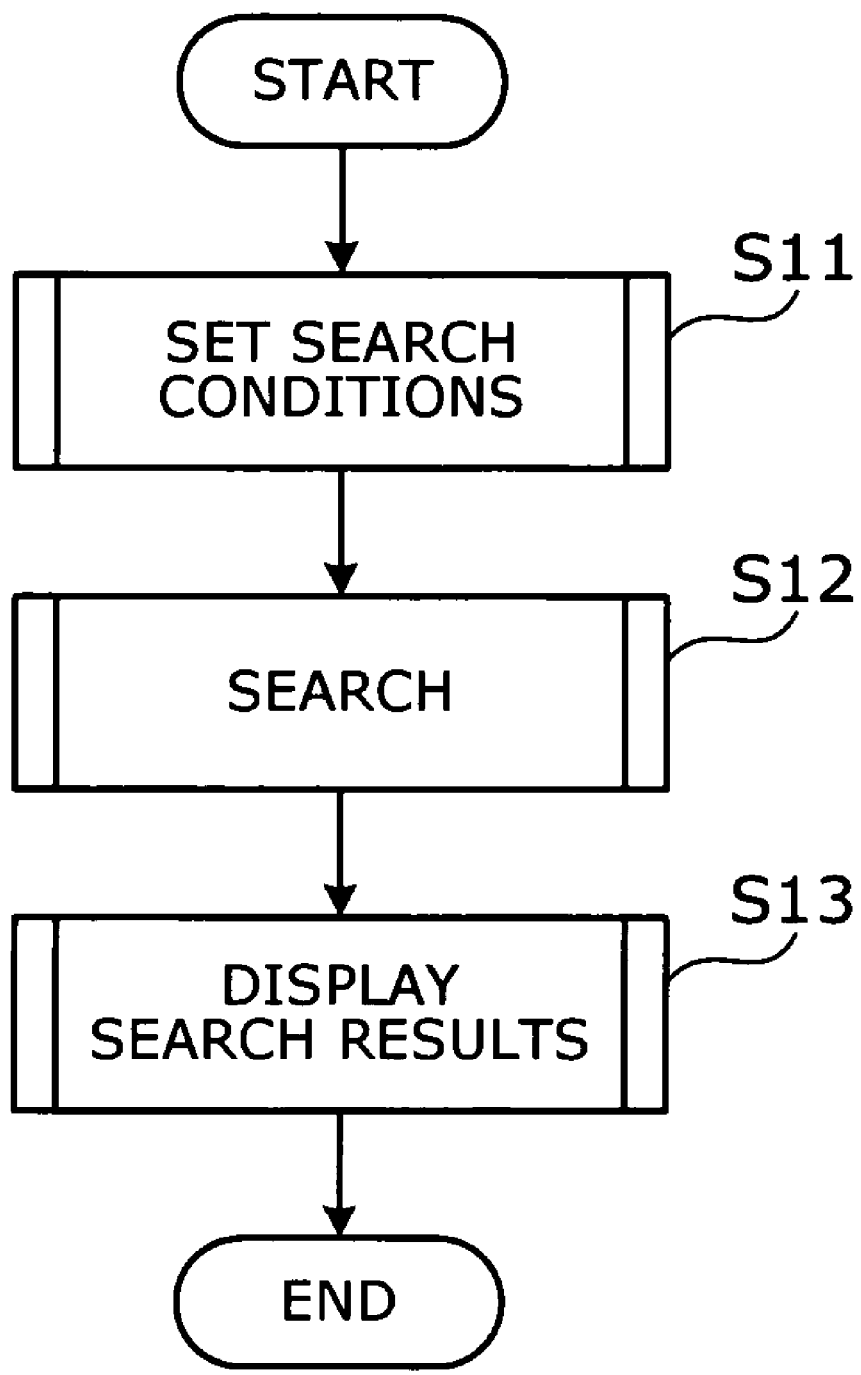
FIG. 6 is a flowchart showing an overall process of information search.

Another function of the portal site server 100 is document searching. Assume now that a search request is issued from the client 21 to the portal site server 100. FIG. 6 is a flowchart showing an overall process of information search, which proceeds in the following steps:

(Step S11) The web server 110 sets specific search conditions (e.g., search keywords) by interacting with the client 21.

(Step S12) The search engine 120 executes a search.

(Step S13) The web server 110 causes the client 21 to display the search results sent from the search engine 120.

Figure 7:
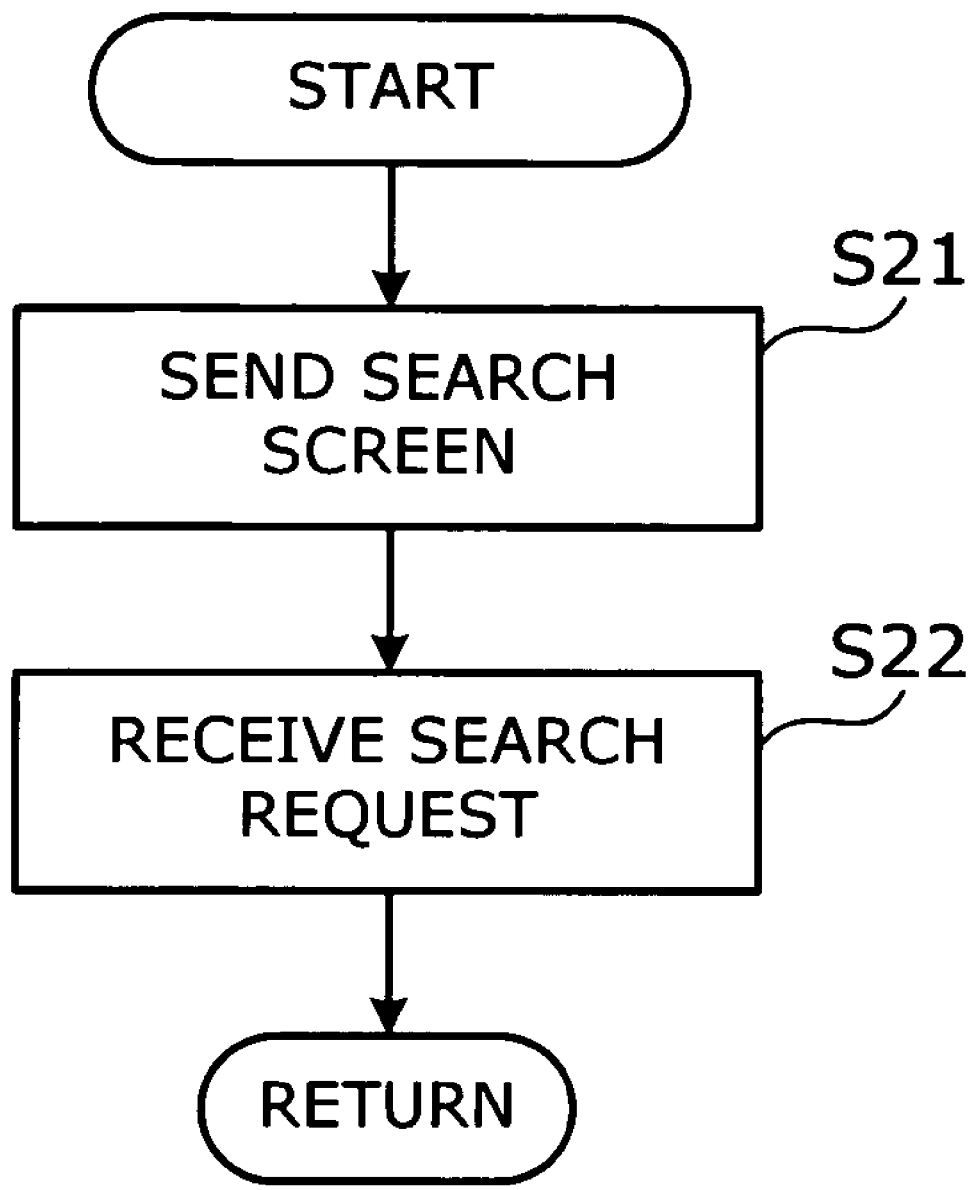
FIG. 7 is a flowchart of a search condition setting process.

Each step of FIG. 6 will now be described in greater detail below. FIG. 7 is a flowchart of a search condition setting process, which proceeds in the following steps:

(Step S21) The client 21 makes access to a search site. Upon detecting this access, the web server 110 responds to the client 21, so that a search dialog will appear on the client 21. The user sitting at the client 21 enters search keywords on the search dialog and hits a search button. This causes the client 21 to send the portal site server 100 a search request including the specified search keywords.

(Step S22) The web server 110 receives the search request from the client 21. The web server 110 passes the specified search keywords to the search engine 120 as search conditions.

Figure 8:
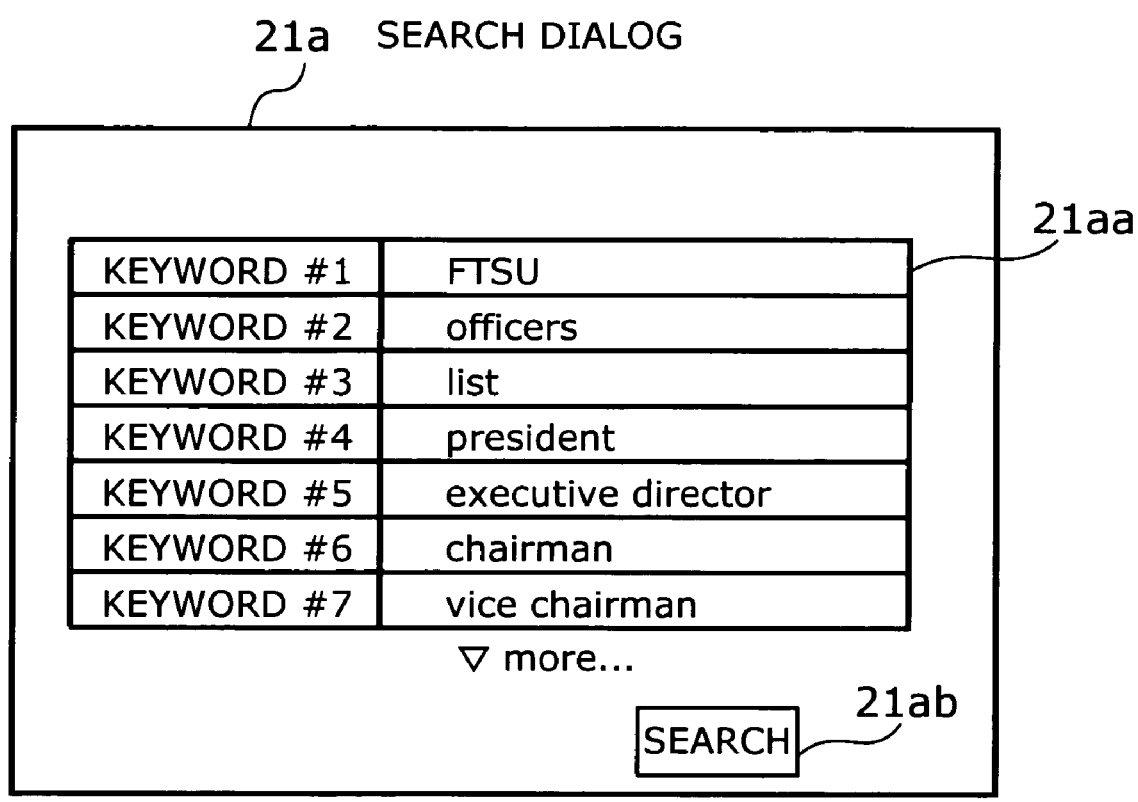
FIG. 8 shows an example search dialog.

FIG. 8 shows an example of a search dialog. This search dialog 21a appears on a monitor of the client 21, providing search keyword fields 21aa and a search button 21ab. The search keyword fields 21aa are a collection of text boxes for entry of keywords that are supposed to be included in the documents that the user is looking for. The search keyword fields 21aa accept one or more search keywords. The search button 21ab permits the user to initiate a search for documents with the entered search keywords. When this search button 21ab is pressed, an AND search request including specified keywords is sent from the client 21 to the portal site server 100, which triggers execution of a search process on the portal site server 100.

Multiple-Stage Search Process

Figure 9:
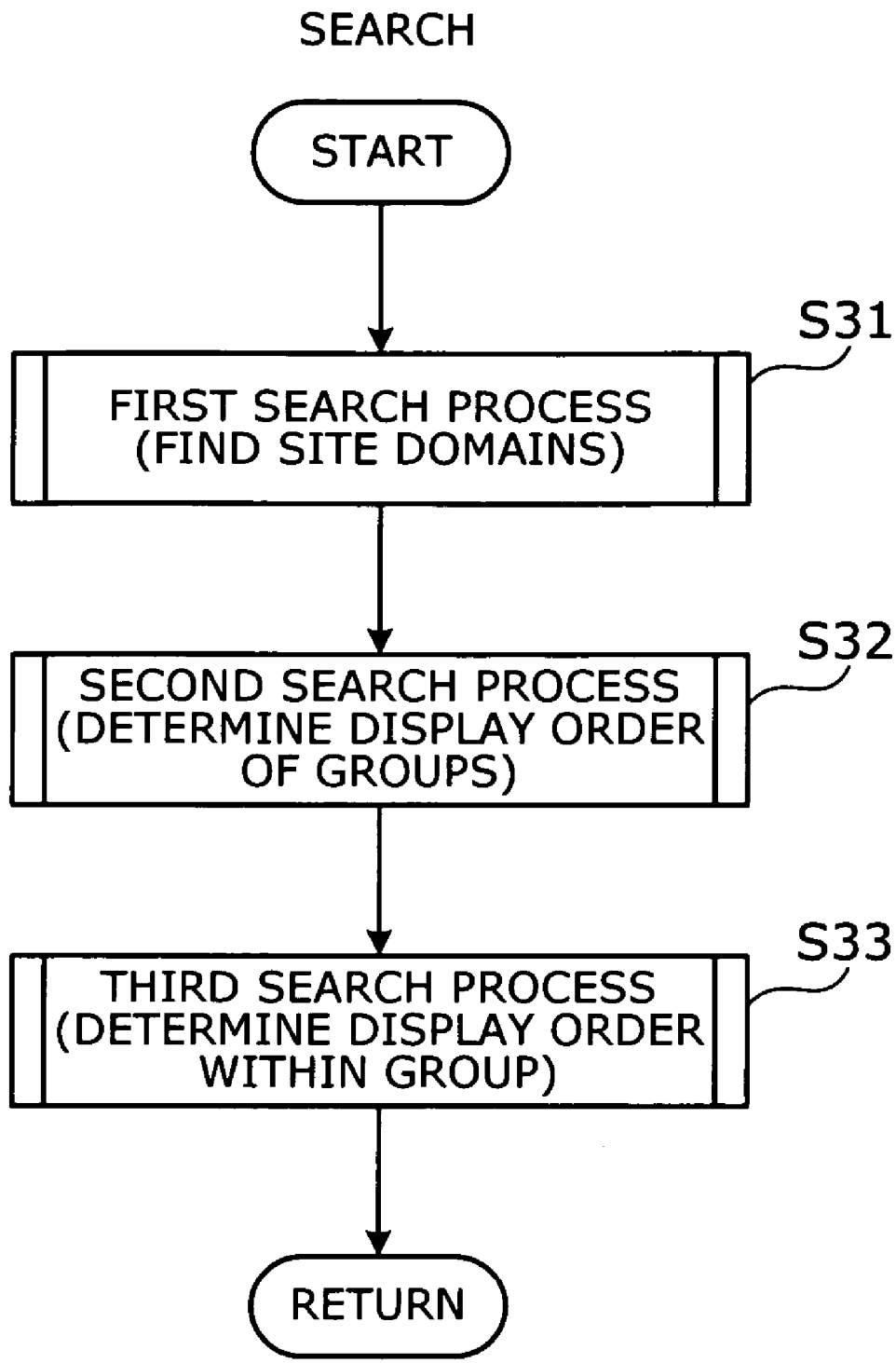
FIG. 9 is a flowchart of a search process.

Referring now to the flowchart of FIG. 9, the following will provide details of how the portal site server 100 performs a search. The search process shown in FIG. 9 proceeds in the following steps:

(Step S31) The search module 122 in the search engine 120 performs a first search process to find relevant site domains (i.e., groups of documents sharing a common domain name).

(Step S32) The search module 122 performs a second search process to determine the display order of groups.

(Step S33) The search module 122 performs a third search process to determine the display order within a group.

Figure 10:
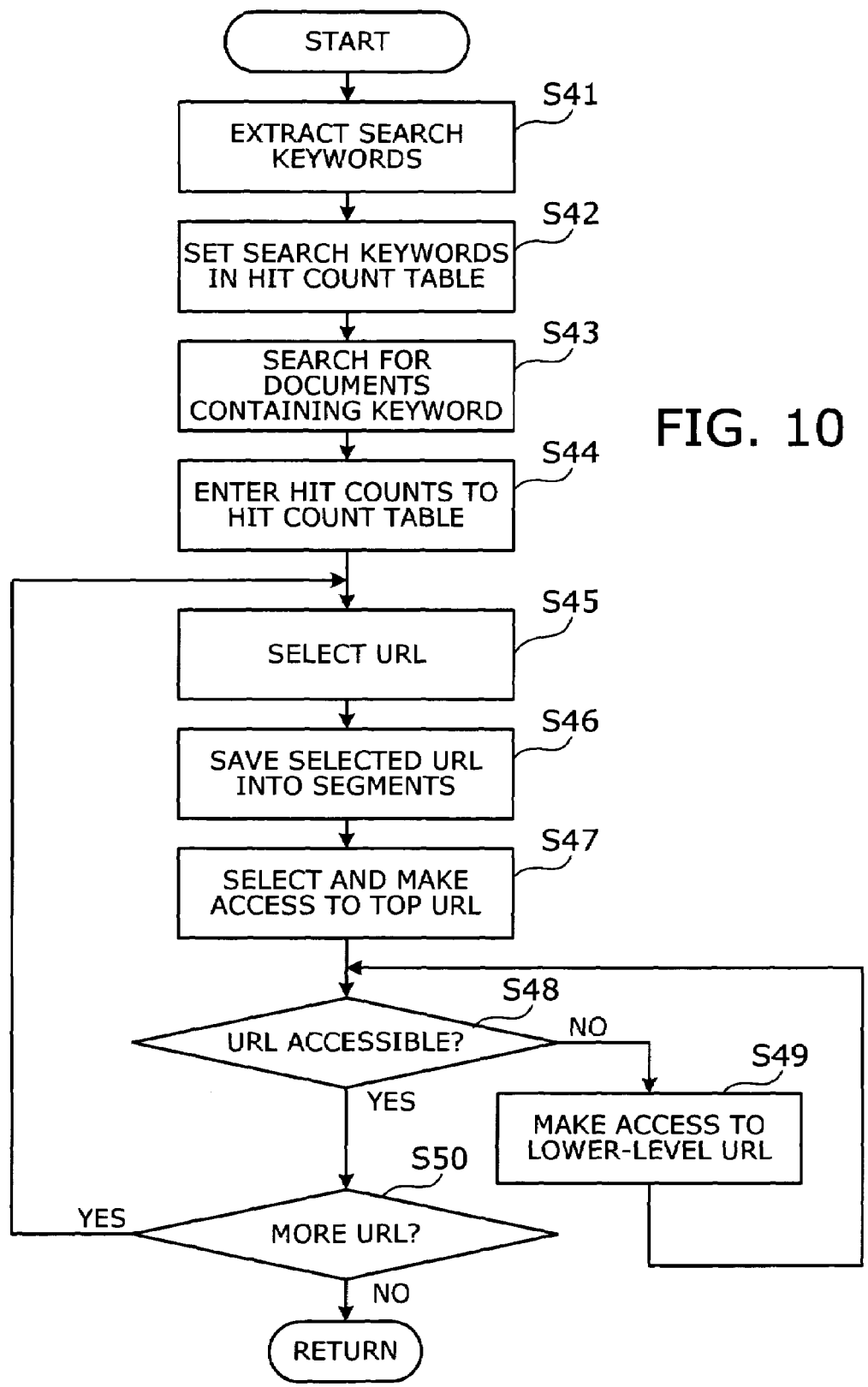
FIG. 10 is a detailed flowchart of a first search process.

The details of each search process will now be described below. FIG. 10 is a flowchart of the first search process, which proceeds in the following steps:

(Step S41) The search module 122 parses a given search request to extract search keywords.

(Step S42) The search module 122 creates a hit count table on the RAM 102 and sets the specified search keywords in that table.

(Step S43) The search module 122 searches each index 131, 132, and 133 in the index memory 130 in an attempt to find out whether they contains the specified search keywords. While an AND search is requested, what is performed at this step S43 is actually an OR search; that is, documents containing at least one of the specified keywords will be found relevant (i.e., a hit). The search module 122 also counts how many instances of a search keyword appear in the same document.

(Step S44) The search module 122 registers the hit count of each document with the hit count table. Here the term "hit count" means how many of the search keywords are found in the index of a document. A higher priority is given to a document containing more keywords.

(Step S45) The search module 122 selects one of the hits (URLs) in descending order of priority.

(Step S46) The search module 122 divides the character string of the selected URL into a plurality of segments delimited by a slash mark ("/"). The resulting substrings, referred to as "URL segments," are then stored into the RAM 102. Think of, for example, a URL of "http://AAA/BBB/CCC.html." This URL is composed of a root domain name "AAA," a directory name "BBB," and a file name "CCC.html," each separated by a single slash mark. The search module 122 therefore divides it into the following three segments: "http://AAA," "BBB," and "CCC.html."

(Step S47) The search module 122 reads the top URL segment out of the RAM 102 to make access to the corresponding site. Specifically, with the example URL (see step S46), the search module 122 makes access to http://AAA in the first place. Since this URL "http://AAA" refers to the root directory of the domain named "AAA," the corresponding content server returns a default file (e.g., http://AAA/index.html), if any, to the search module 122.

Instead of direct access to the real URL, the search module 122 may also be designed to consult the index memory 130 to determine whether there is an index corresponding to the URL. The presence of such an index means that the indexer 121 has once succeeded in gaining access to that URL, or the URL is accessible.

(Step S48) The search module 122 determines whether the URL is accessible. If so, the search module 122 recognizes the URL and its lower-level structure as a site domain, thus advancing the process to step S50. If not, the process proceeds to step S49.

(Step S49) The search module 122 now attempts to have access to the next lower level of the same URL. For example, if the root domain "http://AAA" does not respond, then the search module 122 tries "http://AAA/BBB." In this way, the search module 122 goes down to lower-level domains, or subdomains, step by step until it can receive a normal response from the target website. The process returns from step S49 to step S48 to repeat testing the present URL.

(Step S50) The search module 122 determines whether all the hits have been processed. If there remains a URL that has not been selected at step S45, then the process goes back to step S45 to select that URL. If there are no remaining URLs, the first search process will be terminated.

FIG. 11 shows an example of a hit count table. This example hit count table 41 has been created in response to an AND search request with seven search keywords. The table 41 therefore has columns for the seven search keywords: "FTSU," "officers," "list," "president," "executive director," "chairman," and "vice chairman." Other columns of the hit count table 41 are: "Order," "Hit URL," and "Search Result." Each set of field values horizontally arranged in FIG. 11 forms a single record.

The order field of a record contains a specific priority level (the smaller, the higher) of a URL that has been hit in the first search process. The priority is determined in descending order of the values shown in the search result field. Specifically, the record with the largest search result value is given a highest priority level ("1"). The hit URL field of a record indicates a specific URL that is found relevant in the first search process. The hit count table 41 has as many search keyword fields as the number of keywords specified in the search request, which indicate whether each specified search keyword is contained ("1") or not ("0") in a document corresponding to each URL. The search result field of a record indicates how many different search keywords are found at each corresponding URL. Specifically, the search result field of a record shows a sum of the corresponding search keyword fields in that record.

Note that none of the documents (URLs) listed in the example hit count table of FIG. 11 contain all search keywords. In such cases, an AND search would end up with no hits. According to the present embodiment, on the other hand, the hit count table 41 accepts partial hits; i.e., it accepts any document if it contains at least one search keyword. The present embodiment then determines a site domain corresponding to each document URL registered in the hit count table 41 as follows.

With the hit count table 41 of FIG. 11, the search module 122 extracts URLs in descending order of priority (i.e., from the URL with the smallest "order" field value). Specifically, the URL to be extracted first is "http://www.y.com//b.html" in the context of FIG. 11. This URL is divided into segments delimited by slash marks, and a domain name "http://www.y.com" is extracted. If one domain designated by a URL segment is not accessible, the next segment (i.e., directory name following the next slash mark) extracted from the original URL will be added until the resulting URL is found accessible. Finally the shortest accessible URL (i.e., the highest-level accessible domain or subdomain) is identified as a site domain. The same process is also applied to the next prioritized URL ("http://www.z.com//f.html") to identify its corresponding site domain. After that, a second search process is invoked.

Figure 12:
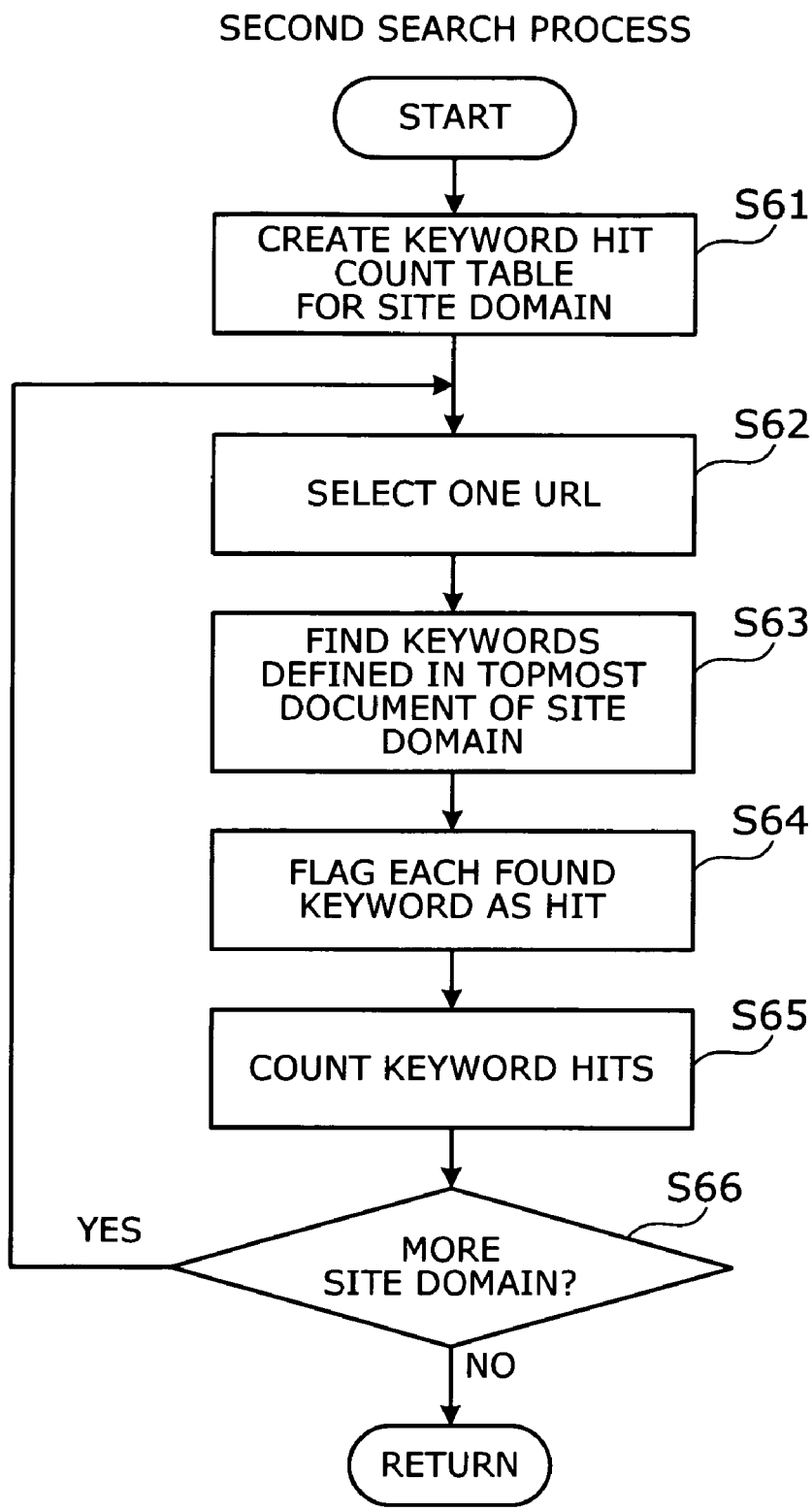
FIG. 12 is a detailed flowchart of a second search process.

FIG. 12 is a flowchart of a second search process, which proceeds in the following steps:

(Step S61) The search module 122 creates a keyword hit count table of site domains. Specifically, this table contains one record for each site domain identified in association with a hit URL.

(Step S62) Out of the keyword hit count table, the search module 122 selects one site domain (URL) that has not undergone the processing of steps S63 to S65.

(Step S63) The search module 122 executes a search on a set of keywords defined in the topmost document of the selected site domain in an attempt to find out whether any specified search keyword is included in that definition. Specifically, many HTML documents include a keyword meta tag in the form of, for example, <meta name="keywords" content="FTSU, IT, computer, personal computer">. This gives a list of keywords explicitly defined to characterize the document.

(Step S64) If the topmost document of the selected site domain contains a specified keyword, the search module 122 flags that keyword as a hit in the keyword hit count table by setting a value of "1" to the corresponding field.

(Step S65) The search module 122 counts the search keywords flagged with "1" in the keyword hit count table.

(Step S66) The search module 122 determines whether there remains any site domain that has not been selected. If such a site domain is present, the process goes back to step S62. If all site domains have been finished, the second search process is terminated.

Referring again to the example hit count table 41 of FIG. 11, the above-described second search process actually works as follows. Assume now that the site domain of "http://www.y.com//b.html" is "http://www.y.com," and that of "http://www.z.com//f.html" is "http://www.z.com.". Also assume that the document appearing at "http://www.y.com" has a definition of keywords of "NDC," "NDC Corporation," "network," "solution," "electronic device," "personal computer," "broadband," "mobile," and "cellular phone." Likewise, the document appearing at "http://www.z.com" has "FTSU," "FTSU Limited," "IT," "computer," and "personal computer".

The user specified search keywords in the present context are: "FTSU," "officers," "list," "president," "executive director," "chairman," and "vice chairman." Since none of these keywords are included in the keyword meta tag of the site domain "http://www.y.com," the second search for that site results in no hits. On the other hand, another site domain "http://www.z.com" includes one search keyword, "FTSU,"

and thus the search yields a hit count of one. The search module 122 performs the same for other site domains, searching their topmost document for search keywords and registering the result with a keyword hit count table.

FIG. 13 shows an example of a keyword hit count table. This keyword hit count table 42 has been produced in accordance with the hit URLs shown in FIG. 11. The table 42 has the following data fields: "order," "site domain," "search keyword," and "keyword hit score"

The order field represents the priority of a corresponding site domain determined from keyword hit scores. The site domain field shows the URL of a corresponding site domain. A separate search keyword field is provided for each search keyword specified in a search request. Each search keyword field indicates whether the topmost document of the corresponding site domain contains that keyword ("1") or not ("0"). The keyword hit score field shows how many of those search keywords are included in the corresponding topmost document. The site domains are prioritized according to their respective keyword hit scores.

Figure 14:
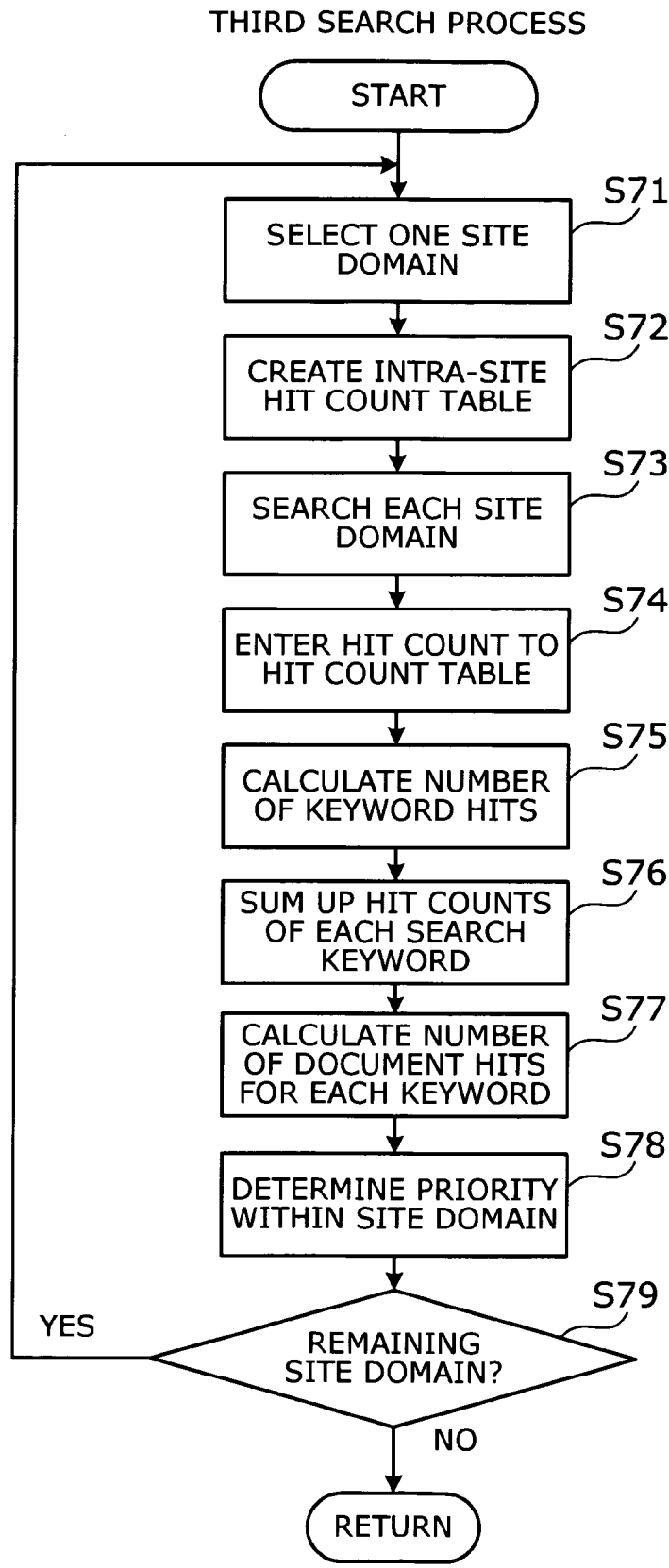
FIG. 14 is a detailed flowchart of a third search process.

The above-described second search process is followed by a third search process. FIG. 14 is a flowchart of a third search process, which proceeds in the following steps:

(Step S71) From among the site domains listed in the keyword hit count table 42, the search module 122 selects one site domain that has not undergone the processing of steps S72 to S78.

(Step S72) The search module 122 produces an intra-site hit count table corresponding to the selected site domain.

(Step S73) With the specified search keywords, the search module 122 performs an OR search on every document in the selected site domain.

(Step S74) The search module 122 registers the resulting hit counts with the intra-site hit count table.

(Step S75) The search module 122 calculates how many of the search keywords are hit in the documents of each site domain.

(Step S76) For each keyword, the search module 122 calculates how many documents are hit in the entire site domain.

(Step S77) The search module 122 calculates how many documents are hit, with respect to each different search keyword.

(Step S78) The search module 122 determines the priority of documents within the site domain that is currently selected. According to the present embodiment, the priority is determined in ascending order of rarity scores of documents. The rarity score is calculated as a product of the keyword hit score (a) and the document hit score (b). A document containing a keyword with a smaller rarity score is given a higher priority.

(Step S79) The search module 122 determines whether there remains any site domain that has not been selected. If such a site domain is present, the process advances to step S71. If all site domains have been finished, the third search process is terminated.

FIG. 15 shows an example of an intra-site hit count table. This intra-site hit count table 43 has the following data fields: "order," "URL," "search keyword," and "keyword hit score."

The order field is used to store a priority value that is determined from hit counts of each corresponding site domain. The URL field shows the URL of each document in the site domain of interest. For each search keyword specified in the search request, the search keyword field contains a hit count indicating how many instances of the keyword are included in a document at the corresponding URL. The keyword hit score field shows how many of the search keywords are hit at the corresponding URL.

The intra-site hit count table 43 further has some additional rows titled "keyword hit score," "document hit score," "rarity score," and "priority." Those additional rows, particularly the keyword hit score and rarity score, are used in sorting the document URLs listed in the intra-site hit count table 43 before they are displayed as a search result. More specifically, documents are sorted first in descending order of keyword hit scores, and if there are two or more documents with the same scores, they are sorted again in ascending order of rarity scores and priority. The search result obtained through the above processing is now passed to a subsequent process for display at the client 21.

Display of Search Results

Figure 16:
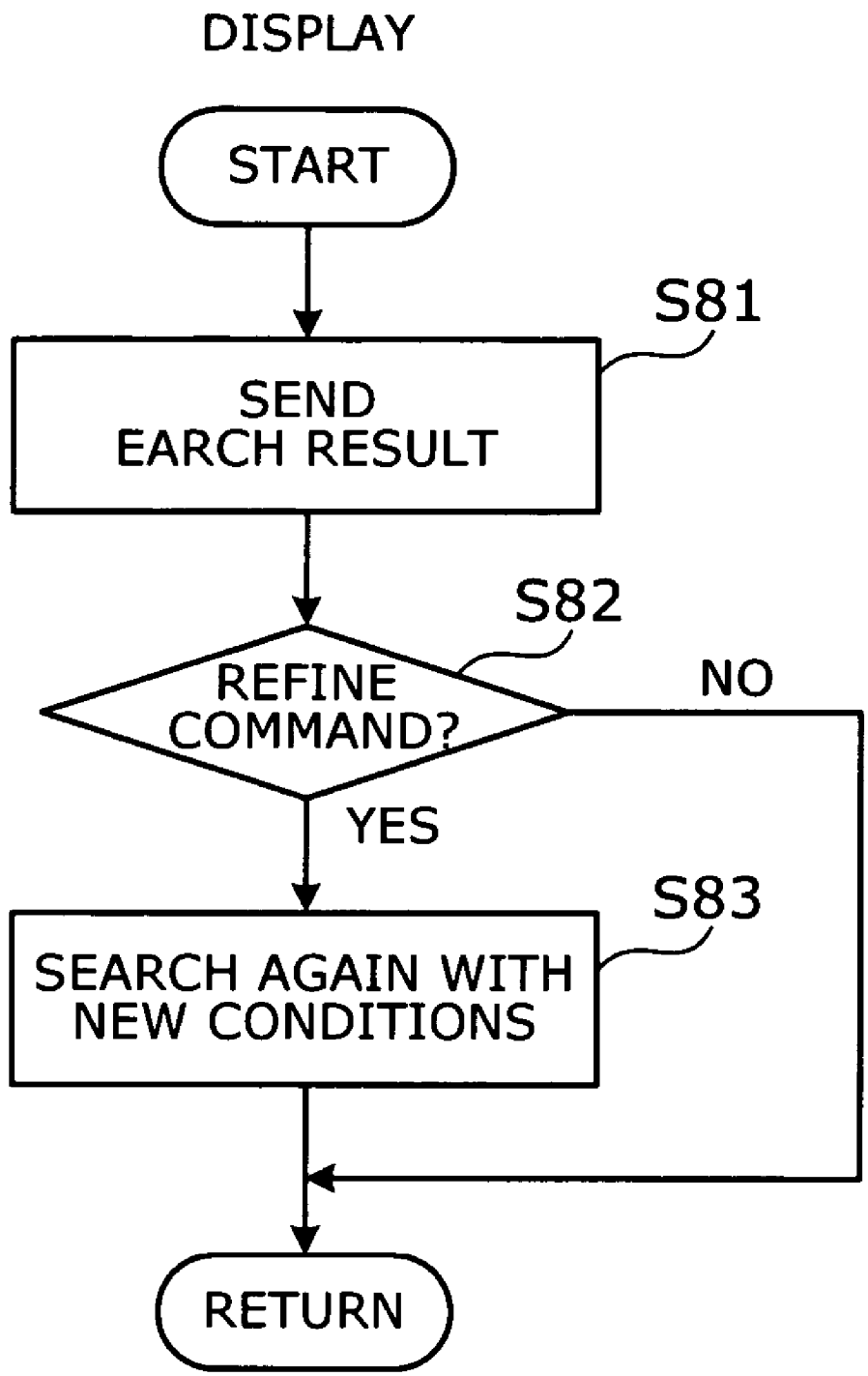
FIG. 16 is a flowchart of a display process.

FIG. 16 is a flowchart of a display process, which proceeds in the following steps:

(Step S81) The search module 122 specifies the display order of site domains according to the priority determined in the second search process. The search module 122 further specifies the display order of documents within a site domain according to the priority determined in the third search result. The information of the retrieved documents is laid out in a summary document, and the search module 122 sends it to the requesting client 21.

(Step S82) The search module 122 determines whether the client 21 has issued a refine command. A refine command instructs the portal site server 100 to move the focus to a lower-level URL in a specified site domain. If this command is issued, the process advances to step S83. Otherwise, the process is terminated.

(Step S83) Now that a refine command is active, the search module 122 is given a URL specified in the refine condition. The search module 122 performs a search by using the given URL for the top URL segment at step S47 of the first search process (see FIG. 10).

Figure 17:
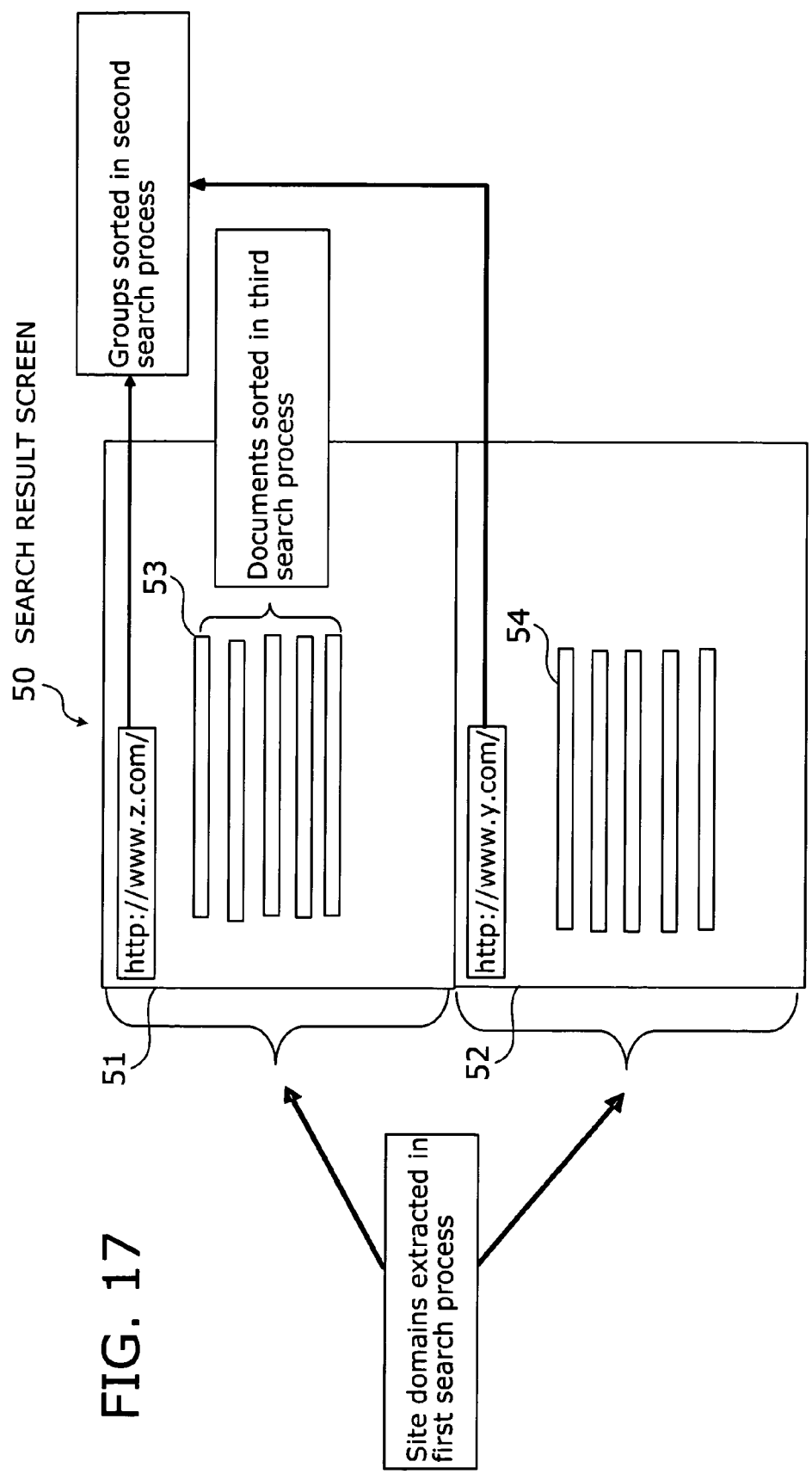
FIG. 17 shows an example of a search result screen.

The above display process permits the client 21 to receive and display a search result screen on its monitor. FIG. 17 shows an example of a search result screen. The illustrated search result screen 50 is composed of two site domain fields 51 and 52 corresponding to site domains identified in the first search process. These site domain fields 51 and 52 are arranged according to the display priority of site domains determined in the second search process.

The site domain fields 51 and 52 show document lists 53 and 54, respectively, including links to specific documents in those sites. Within each document list 53 and 54, documents with higher priority will appear in the first place according to the result of the third search process.

The search algorithm of the present embodiment extracts relevant documents depending on the content of a topmost document in a site domain, whereas conventional search engines disregard or give a lower display priority to some documents. That is, the present embodiment makes it possible to find documents more effectively than the conventional search methods.

Suppose, for example, that a user needs a list of corporate officers of FTSU Limited. FIG. 18 shows a document containing a list of officers. The illustrated document 61 contains the terms "officers," "directors," and the like, but not "FTSU." The document 61 is placed in a website for publicity of FTSU Limited, and a document at the top of this website contains the term "FTSU."

Without knowledge about actual documents at the FTSU website, the user sitting at the client 21 now enters multiple search keywords "FTSU," "directors," "list," "president," "executive director," "chairman," and "vice chairman" to invoke an AND search. This search request is delivered to the portal site server 100. Because of the AND logic applied to the keywords, conventional search engines would not be able to retrieve the document 61 since the term "FTSU" is missing.

By contrast, the search module 122 of the present embodiment first examines whether the document 61 has at least one specified search keyword, and if it has, the search module 122 extracts the location of that document as a site domain. Priority of site domains is determined according to how many search keywords are included in their respective topmost documents. In the case of the document 61, the topmost document of its site domain has a keyword "FTSU" as stated above. For this reason, the document 61 will likely be prioritized over other documents when they are displayed.

Within the same site domain, a document containing many search keywords will be displayed with a higher priority than others. In the case of FIG. 18, the document 61 will likely be prioritized over other documents since it contains most of the specified search keywords, including "officers," "list," and the like.

FIG. 19 shows an example screen of a search result. The illustrated search result screen 62 begins with the information about the document 61 of FIG. 18, thus permitting the user to notice the presence of that document 61. This means that the user can obtain a list of officers of FTSU Limited. URLs and other information about each document in a site domain are arranged on the screen in descending order of the number of search keywords that are hit in the search. The information on a document includes a hyperlink to the website location of that document, allowing the user to call up the document by simply selecting it with a pointing device or the like.

The number of results (e.g., document URLs) displayed on the search result screen 62 may be controlled by setting a maximum document number for each site domain. In this case, the search result screen 62 shows only a part of the documents found in a site domain. Page buttons 62a and 62b permits the user to browse other search results. When the previous page button 62a is selected with a pointing device, the search result screen 62 is updated with another set of search results with a higher display priority than the current ones. When the next page button 62b is selected, the search result screen 62 is refreshed with search results with a lower display priority than the current ones.

The search result screen 62 of FIG. 19 also offers a search-again command button 62c for the user to control the range of site domains when he/she feels overwhelmed by, or unsatisfied with, the current search results. Selecting this search-again command button 62c causes the client 21 to open a site domain selection screen.

Figure 20:
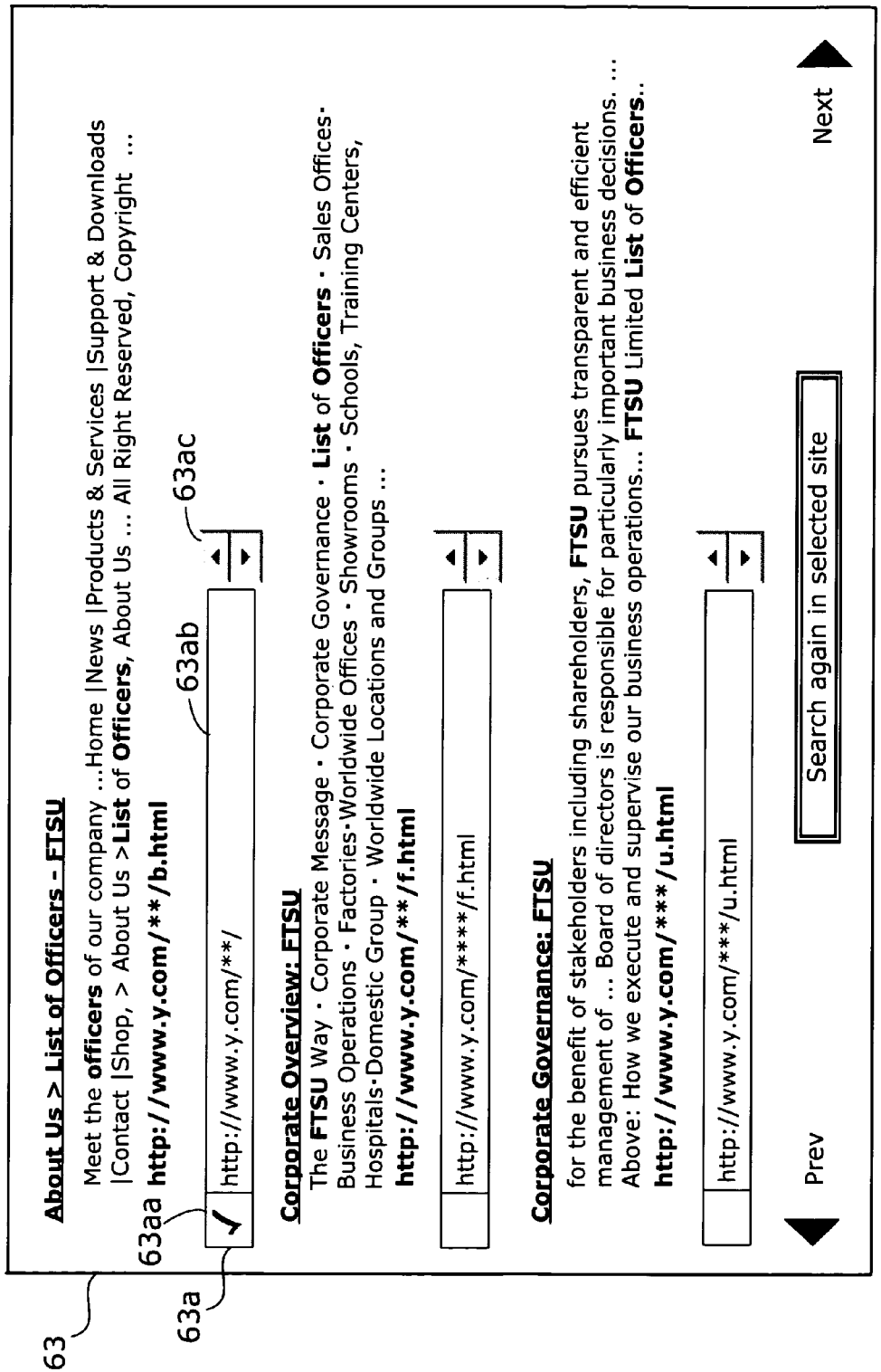
FIG. 20 shows an example of a site domain selection screen.

FIG. 20 shows an example of a site domain selection screen. The illustrated site domain selection screen 63 provides a site domain selector 63a in association with each set of document information. The site domain selector 63a is composed of a check box 63aa, a text box 63ab, and up and down arrows 63ac. The user activates the site domain selector 63a by selecting the check box 63aa to place a check mark in it. The text box 63ab shows the currently specified site domain, whose default value is the URL of the document file ("http://www.y.com/\*\*/b.html" in the present example).

The up and down arrows 63ac allows the user to move up or down in the URL hierarchy. Each time the up arrow is clicked, the rightmost segment of URL in the text box 63ab is truncated, meaning that an upper-level domain is specified. By repeating this action, the user can go up to the root domain of the site. The down arrow, on the other hand, adds a lower-level URL segment to the right of the current URL each time it is clicked, meaning that a lower-level domain is specified. By repeating this action, the user can go down to the URL of a document file being displayed as a search result.

Variations

This section will describe several variations of the present embodiment. According to the foregoing embodiment, the second search process determines priority of site domains by evaluating how many of the specified search keywords are found in the topmost document of each site. As an alternative algorithm for this, the second search process may be modified to determine the priority depending on whether the second search on a selected site has found any of the search keywords that the preceding first search process failed to find.

Suppose, for example, that the first search process has produced a hit count table 41 shown in FIG. 11. Also suppose that "http://www.y.com" returns a document containing keywords of "NDC," "NDC Corporation," "network," "solution," "electronic device," "personal computer," "broadband," "mobile," "cellular phone," "broadband," and "mobile" when the search module 122 makes access to that site. Further suppose that "http://www.x.com" returns a document containing keywords of "FTSU," "FTSU Limited," "IT," "computer," "personal computer," and "list."

In the above-described situation, none of the keywords defined in one site domain "http://www.y.com" matches with the specified search keywords (i.e., "FTSU," "officers," "list," "president," "executive vice president," "chairman"), hence no hits. By contrast, the other site domain "http://www.z.com" gives two hits of "FTSU" and "list."

FIG. 21 shows an example of a keyword hit count table. This keyword hit count table 42 flags the two keywords "FTSU" and "list" in the entry of "http://www.z.com" and shows a value of "2" in the corresponding keyword hit score field. The search module 122 then updates the hit count table 41 with reference to the keyword hit count table 42. That is, the search module 122 recreates the hit count table 41, assuming that the keywords defined in the topmost document of a site domain are also included in a document that is hit.

FIG. 22 shows how the hit count table 41 is updated. As can be seen from this new hit count table 41 compared with the one shown in FIG. 11, the search keywords "FTSU" and "list" are flagged with a value of "1" in the record of "http://www.z.com/\*\*/f.html." Also, the corresponding search result field has been changed from "4" to "6" because of the additional two keyword hits obtained by the second search process. The entries of the updated hit count table 41 are sorted in descending order of the search result field values. Note that "http://www.z.com/\*\*/f.html" now has the highest priority. The search module 122 refers to this order field of the hit count table 41 when sorting site domains for determining display order of search results. That is, the site domains are rearranged in descending order of priority (or in ascending order of the "order" field values.

As another variation of the foregoing embodiment, the third search process may be configured to remove a site domain if there is a search keyword that is not included in any documents in that site domain (or in other words, if the corresponding intra-site hit count table 43 has at least one zero-valued search keyword field). That is, when a search request from a user specifies an AND operation of search keywords, it implies a search condition that "every specified search keyword should be included in at least one document in the same site domain.

As yet another variation of the foregoing embodiment, the second search process may consult the index of a document at an upper hierarchical level in a website found by the first search process, as opposed to examining keywords given in a keyword meta tag in that upper-level document. It is also possible to modify the second search process so as to consult the index of every other document in the same site domain. The probability of producing relevant search results will be increased by expanding the scope of index searching to the entire text of the topmost document or to the entire site domain.

Figure 23:
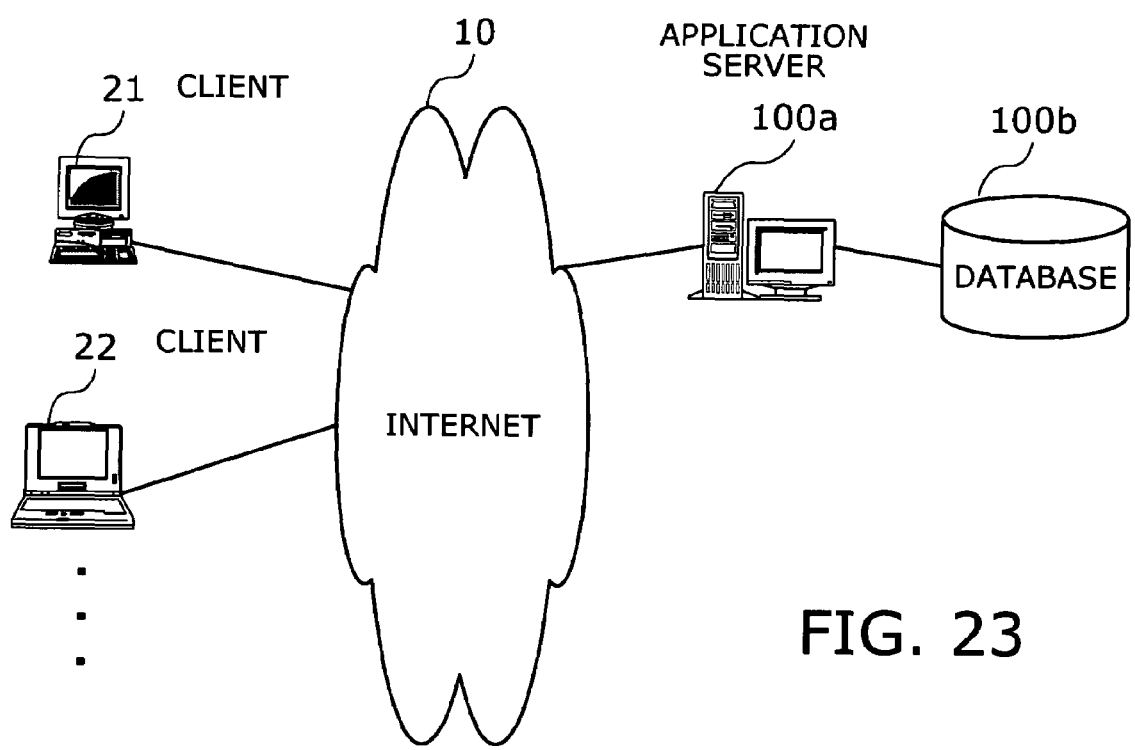
FIG. 23 shows an example system configuration in which information search service for a large-scale database is provided.
Figure 24:
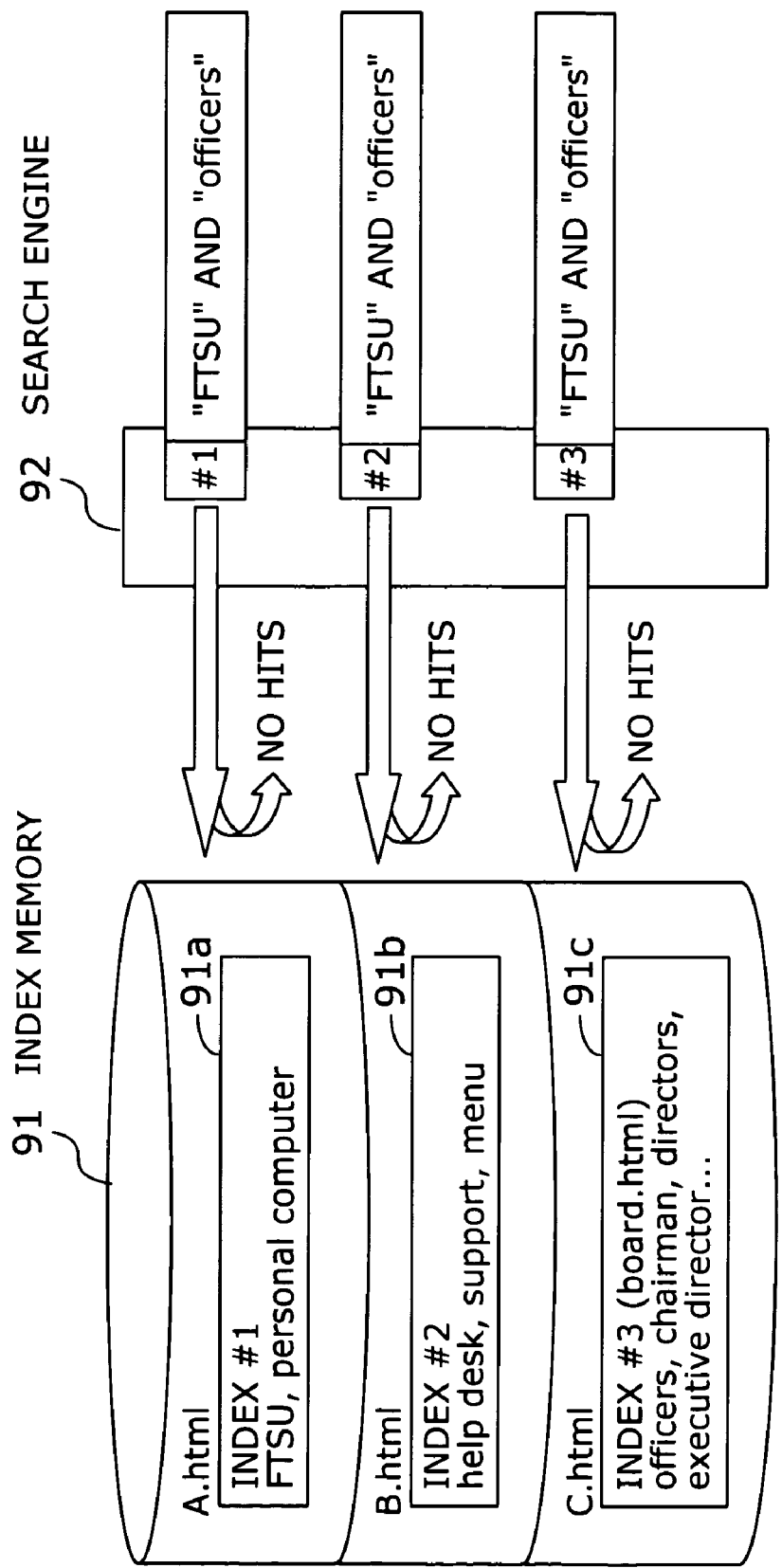
FIG. 24 shows a conventional search technique.

The foregoing description has assumed a system for searching documents publicized through content servers on the Internet. The proposed search algorithm may also be applied to other systems such as a large-scale database. FIG. 23 shows an example system configuration in which information search services for a large-scale database are provided. The illustrated system on the Internet 10 includes an application server 100a with a database 100b. With information search services that it provides, the application server 100a allows clients 21 and 22 to use the database 100b. That is, the application server 100a performs a search on its database 100b in response to a request from the clients 21 and 22 and sends the search results back to the requesting client.

The application server 100a has search functions equivalent to the search engine 120 described in FIG. 4. The indexer 121 in this case creates indexes of data records stored in the database 100b, just as it does for documents in the content servers 31 and 32 in the system of FIG. 4, thereby enabling users to retrieve desired information from the database 100b.

Program Storage Media

The above-described processing mechanisms of the present invention are actually implemented on a computer system, the instructions of which are encoded in the form of computer programs. A computer system executes those programs to provide intended functions of the present invention. For the purpose of storage and distribution, the programs may be stored in a computer-readable storage medium. Suitable computer-readable storage media include magnetic storage media, optical discs, magneto-optical storage media, and solid state memory devices. Magnetic storage media include hard disk drives (HDD), flexible disks (FD), and magnetic tapes. Optical disc media include digital versatile discs (DVD), DVD-RAM, compact disc read-only memory (CD-ROM), CD-Recordable (CD-R), and CD-Rewritable (CD-RW). Magneto-optical storage media include magneto-optical discs (MO).

Portable storage media, such as DVD and CD-ROM, are suitable for the distribution of program products. Network-based distribution of software programs is also possible, in which case several master program files are made available on a server computer for downloading to other computers via a network. A user computer stores necessary programs in its local storage unit, which have previously been installed from a portable storage media or downloaded from a server computer. The computer executes the programs read out of the local storage unit, thereby performing the programmed functions. As an alternative way of program execution, the computer may execute programs, reading out program codes directly from a portable storage medium. Another alternative method is that the user computer dynamically downloads programs from a server computer when they are demanded and executes them upon delivery.

CONCLUSION

As can be seen from the above description of the present invention, the proposed apparatus and method identifies a group of each tentative search result containing search keywords and prioritize a particular search result if search keywords are found in a document at a higher hierarchical level in the group of that search result. With this algorithm, even a partial hit may be given a higher display priority if an upper-level document in the same group includes other keywords. Accordingly, more relevant search results will be obtained even in the case where the specified search keywords are distributed over a plurality of documents.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. An information searching apparatus for searching documents arranged in a hierarchical manner, the apparatus comprising:
an index memory storing indexes of documents to be searched, each index containing keywords extracted from the corresponding document in association with a locator of that document;
at least one processing device executing
a first search module that searches the index memory upon receipt of a search request specifying a plurality of search keywords from a client device, to find documents whose corresponding indexes contain at least one of the specified search keywords, and identifies the found documents as tentative search results;
a categorizer that determines to which group the tentative search result should belong, according to predefined rules;
a second search module that searches an upper hierarchical level in the same group of the tentative search result to find a document containing at least one of the specified search keywords;
a group order determiner that gives a higher display priority to the group in which the second search module has found the upper-level document;
a third search module that determines display priorities of the documents within each of the groups according to rarity of the search keywords in the documents by giving a higher display priority to a document containing a rarer search keyword, wherein the third search module calculates a rarity score of each search keyword as a product of a total number of instances of each search keyword and a number of documents containing that search keyword, a search keyword with a smaller rarity score having a higher rarity; and
a search result sender that extracts the locator of each search result from the index memory and, based on association between the groups and the extracted locators, rearranges the locators in descending order of the display priority before sending the locators to the client device for being displayed.

2. The information searching apparatus according to claim 1, wherein the predetermined rules cause the categorizer to determine the group of search results according to root domain names given as part of the locators of the documents.

3. The information searching apparatus according to claim 1, wherein the predetermined rules cause the categorizer to determine the group of search results according to directory names following a root domain name given as part of the locator of each document.

4. The information searching apparatus according to claim 1, wherein:
the categorizer allows a user of the client device to specify a particular directory; and
the predetermined rules cause the categorizer to define a new group from the specified directory and subordinate directories thereof.

5. The information searching apparatus according to claim 1, wherein the search result sender causes the locators to be displayed separately for each group.

6. The information searching apparatus according to claim 1, wherein the second search module extracts at least one of the search keywords from the topmost document in the group to which the tentative search result belongs.

7. The information searching apparatus according to claim 1, wherein the group order determiner determines the display priority of groups corresponding to the indexes that the second search module has found, in descending order of the number of search keywords contained in each of the indexes.

8. The information searching apparatus according to claim 1, wherein the group order determiner determines the display priority of groups in descending order of the number of search keywords contained either in the index of the tentative search result or in the index of another document in the same group as the tentative search result belongs to.

9. The information searching apparatus according to claim 1, wherein the search result sender sorts the locators of the tentative search results of each group according to how many of the search keywords are included in each corresponding index, before sending the locators to the client.

10. The information searching apparatus according to claim 1, wherein the search result sender finds an index containing a rarer search keyword than others and prioritizes the locator of that index over other locators in the same group.

11. A computer-implemented method for searching documents arranged in a hierarchical manner, the method comprising:

storing indexes of documents in an index memory, each index containing keywords extracted from the corresponding document in association with a locator of that document;

searching the index memory upon receipt of a search request specifying a plurality of search keywords from a client, to find documents whose corresponding indexes contain at least one of the specified search keywords, and identifying the found documents as tentative search results;

determining to which group the tentative search result should belong, according to predefined rules;

searching an upper hierarchical level in the same group of the tentative search result to find a document containing at least one of the specified search keywords;

giving a higher display priority to the group in which the second search module has found the upper-level document;

determining display priorities of the documents within each of the groups according to rarity of the search keywords in the documents by giving a higher display priority to a document containing a rarer search keyword, wherein a rarity score of each search keyword is calculated as a product of a total number of instances of the search keyword and a number of documents containing the search keyword, a search keyword with a smaller rarity score having a higher rarity; and extracting the locator of each search result from the index memory and, based on association between the groups and the extracted locators, rearranging the locators in descending order of the display priority before sending the locators to the client.

12. A computer-readable storage medium storing a program for searching documents arranged in a hierarchical manner, the program causing a computer to execute:

storing indexes of documents to be searched in an index memory, each index containing keywords extracted from the corresponding document in association with a locator of that document;

a first search module that searches the index memory upon receipt of a search request specifying a plurality of search keywords from a client, to find documents whose corresponding indexes contain at least one of the specified search keywords, and identifies the found documents as tentative search results;

a categorizer that determines to which group the tentative search result should belong, according to predefined rules;

a second search module that searches an upper hierarchical level in the same group of the tentative search result to find a document containing at least one of the specified search keywords;

a group order determiner that gives a higher display priority to the group in which the second search module has found the upper-level document;

a third search module that determines display priorities of the documents within each of the groups according to rarity of the search keywords in the documents by giving a higher display priority to a document containing a rarer search keyword, wherein the third search module calculates a rarity score of each search keyword as a product of a total number of instances of each search keyword and a number of documents containing that search keyword, a search keyword with a smaller rarity score having a higher rarity; and a search result sender that extracts the locator of each search result from the index memory and, based on association between the groups and the extracted locators, rearranges the locators in descending order of the display priority before sending the locators to the client.

13. A method of displaying search results of a search for documents using target keywords using a plurality of index files containing respective keywords and location of documents, the documents being hierarchically organized in groups, the method being performed by a computer, comprising:

performing a first search over the plurality of index files by a CPU of the computer, to select documents which include at least one of the target keywords;

determining groups to which the documents selected by the first search belong according to predefined rules, by the CPU of the computer;

performing a second search for upper level documents including at least one of the target keywords, by the CPU of the computer, in respective upper hierarchical levels of the groups to which the documents selected by the first search belong;

determining a group order of the groups to which the documents selected by the first search belong, by giving a higher priority to a group in which the second search has identified an upper level document, by the CPU of the computer;

determining display priorities of the documents within each of the groups according to a rarity of the target keywords in the documents by giving a higher display priority to a document containing a rarer search keyword, wherein the rarity of a target keyword is inversely proportional to a rarity score, which is a product of a total number of instances of each target keyword in the documents and a number of the documents containing the target keyword; and displaying locations of the documents according to the group order and the display priorities.

* * * * *